US008234240B2

(12) United States Patent
Myerson et al.

(10) Patent No.: US 8,234,240 B2
(45) Date of Patent: Jul. 31, 2012

(54) FRAMEWORK FOR PROVIDING METRICS FROM ANY DATASOURCE

(75) Inventors: Neal R. Myerson, Seattle, WA (US); Darren C. Justus, New York, NY (US); Jitendra Luniya, Pune (IN); Carroll W. Moon, Altavista, VA (US); Susan Pallini, Windham, NH (US)

(73) Assignee: Microsoft Corporation, Redmond, WA (US)

( * ) Notice: Subject to any disclaimer, the term of this patent is extended or adjusted under 35 U.S.C. 154(b) by 242 days.

(21) Appl. No.: 11/740,723

(22) Filed: Apr. 26, 2007

(65) Prior Publication Data
US 2008/0270369 A1    Oct. 30, 2008

(51) Int. Cl.
*G06F 7/00*  (2006.01)
*G06F 17/30*  (2006.01)
*G06F 17/00*  (2006.01)

(52) U.S. Cl. .......... 707/603; 707/602; 707/796
(58) Field of Classification Search .......... None
See application file for complete search history.

(56) References Cited

U.S. PATENT DOCUMENTS

| | | | |
|---|---|---|---|
| 6,263,342 B1 * | 7/2001 | Chang et al. | 707/103 R |
| 6,343,275 B1 | 1/2002 | Wong | |
| 6,609,128 B1 * | 8/2003 | Underwood | 707/610 |
| 6,912,561 B1 * | 6/2005 | Baer et al. | 709/203 |
| 6,988,109 B2 | 1/2006 | Stanley et al. | |
| 7,082,441 B1 * | 7/2006 | Zahavi et al. | 707/200 |
| 7,117,215 B1 * | 10/2006 | Kanchwalla et al. | 707/602 |
| 7,150,037 B2 * | 12/2006 | Wolf et al. | 726/6 |
| 7,716,167 B2 * | 5/2010 | Colossi et al. | 707/714 |
| 7,739,224 B1 * | 6/2010 | Weissman et al. | 707/794 |
| 7,822,710 B1 * | 10/2010 | Miller et al. | 707/620 |
| 2002/0152305 A1 * | 10/2002 | Jackson et al. | 709/224 |
| 2002/0165892 A1 * | 11/2002 | Grumann et al. | 709/100 |
| 2002/0174122 A1 | 11/2002 | Chou | |
| 2002/0198985 A1 * | 12/2002 | Fraenkel et al. | 709/224 |
| 2003/0079160 A1 * | 4/2003 | McGee et al. | 714/39 |
| 2004/0103076 A1 | 5/2004 | Casati et al. | |
| 2004/0133445 A1 * | 7/2004 | Rajan et al. | 705/1 |

(Continued)

FOREIGN PATENT DOCUMENTS

WO   0042553 A2   7/2000

(Continued)

OTHER PUBLICATIONS

Jayavel Shanmugasundaram, Usama Fayyad, P. S. Bradley "Compressed Data Cubes for OLAP Aggregate Query Approximation on Continuous Dimensions" ACM 1999.*

(Continued)

*Primary Examiner* — Neveen Abel Jalil
*Assistant Examiner* — Polina Peach
(74) *Attorney, Agent, or Firm* — Vierra Magen Marcus & DeNiro LLP

(57) ABSTRACT

A metrics generation system provides IT and other computing system metrics from different data sources in a single display. Configuration files containing parameters and instructions are loaded by the system to access different data sources. The metrics generation system retrieves IT system health data, processes and aggregates metrics from the retrieved data and displays the metrics based on user defined parameters and instructions in the configuration files. The metrics generation system is flexible in that it can be changed to extract data from different IT data sources, calculate different metric information having a hierarchy of attribute types and values, and display a variety of metric data in different formats.

16 Claims, 15 Drawing Sheets

U.S. PATENT DOCUMENTS

| | | | |
|---|---|---|---|
| 2004/0133551 A1* | 7/2004 | Linstedt | 707/1 |
| 2004/0225680 A1 | 11/2004 | Cameron | |
| 2005/0021541 A1 | 1/2005 | Rangadass et al. | |
| 2005/0086216 A1* | 4/2005 | Davis | 707/3 |
| 2005/0086360 A1 | 4/2005 | Mamou et al. | |
| 2005/0149552 A1* | 7/2005 | Chan et al. | 707/102 |
| 2005/0182647 A1 | 8/2005 | Saenz et al. | |
| 2005/0182969 A1 | 8/2005 | Ginter et al. | |
| 2005/0246357 A1 | 11/2005 | Geary et al. | |
| 2006/0041612 A1* | 2/2006 | Doshi et al. | 709/202 |
| 2006/0112109 A1 | 5/2006 | Chowdhary et al. | |
| 2007/0005154 A1 | 1/2007 | Lancaster et al. | |

FOREIGN PATENT DOCUMENTS

| | | | |
|---|---|---|---|
| WO | 0042553 A3 | 7/2000 | |

OTHER PUBLICATIONS

Dimitris Papadias, Panos Kalnis, Jun Zhang, and Yufei Tao "Efficient OLAP Operations in Spatial Data Warehouses" Springer-Verlag Berlin Heidelberg 2001.*

Microsoft Corporation, "Solving Business Problems With SQL Server 2005 Analysis Services", Apr. 1, 2005, http://www.microsoft.com/technet/prodtechnol/sql/2005/solvngbp.mspx.

Business Objects, "BusinessObjects Warehouse Information", http://www.businessobjects.com/pdf/products/dataintegration/warehouse_information_sheet.pdf.

IBM Corporation, "Tivoli Business Systems Manager" Version 3.1, Guide for Warehouse Pack, Version 3.2.0.0., using Tivoli Data Warehouse, Version 1.2, http://publib.boulder.ibm.com/infocenter/tivihelp/v3r1/topic/com.ibm.tivoli.itbsm.doc/TBSM_320WEP_for_TDW.pdf.

Office Action dated Jul. 14, 2009 in U.S. Appl. No. 11/740,740.
Response to Office Action filed Oct. 14, 2009 in U.S. Appl. No. 11/740,740.
Office Action dated Nov. 20, 2009 in U.S. Appl. No. 11/740,740.
Response to Office Action dated Feb. 22, 2010, U.S. Appl. No. 11/740,740, filed Apr. 26, 2007.
Office Action dated Mar. 10, 2010, U.S. Appl. No. 11/740,740, filed Apr. 26, 2007.
Response to Office Action dated Jun. 10, 2010, U.S. Appl. No. 11/740,740, filed Apr. 26, 2007.
Office Action dated Aug. 2, 2010, U.S. Appl. No. 11/740,740, filed Apr. 26, 2007.
Response to Office Action dated Dec. 2, 2010, U.S. Appl. No. 11/740,740, filed Apr. 26, 2007.
Office Action dated Jun. 13, 2011, U.S. Appl. No. 11/740,740, filed Apr. 26, 2007.
Response to Office Action dated Sep. 13, 2011, U.S. Appl. No. 11/740,740, filed Apr. 26, 2007.
Office Action dated Sep. 29, 2011, U.S. Appl. No. 11/740,740, filed Apr. 26, 2007.

* cited by examiner

Metric Hierarchies

Product                                            Exchange 2003
    Metric (aggregation type)                 Exchange Server 2003 Availability (avg)
        Level 4 attribute – (forest type)             North America
        Level 3 attribute – (region type)              Corp
        Level 2 attribute – (domain type)            Redmond
        Level 1 attribute – (building type)            RC-4
        Level 0 attribute - (entity/server type)      Exchange Server 7

(Format)                                            (Example)

Figure 4

| InboundMeasures | |
|---|---|
| PK,I1 | UID |
| | UniqueEntityName |
| | EntityDisplayName |
| | MeasureName |
| | MeasurePK1 |
| | MeasurePK2 |
| | MeasurePK3 |
| | SampleValue |
| | DateTimeAdded |
| | DateTimeSampled |
| | DateOfSmaple |
| | UpdateDateTime |

| InboundEvents | |
|---|---|
| PK,I1 | UID |
| | UniqueEntityName |
| | EventID |
| | EventSource |
| | EventMessage |
| | DateTimeOfEvent |
| | UpdateDateTime |

| OutboundDimConfig | |
|---|---|
| PK,I1 | ConfigUD |
| | Product_FK |
| | Metric_FK |
| | Level4_FK |
| | Level3_FK |
| | Level2_FK |
| | Level1_FK |
| | Level0Entity_FK |
| | WeightingFactor |
| | IsTransferred |
| | UpdateDateTime |

| OutboundDimProduct | |
|---|---|
| PK,I1 | ProductID |
| | ProductName |
| | ProductDisplayName |
| | IsTransferred |
| | UpdatedDateTime |

| OutboundDimLevel4 | |
|---|---|
| PK,I1 | Level4ID |
| | Level4Name |
| | Level4DisplayName |
| | IsTransferred |
| | UpdateDateTime |

| OutboundDimLevel1 | |
|---|---|
| PK,I1 | Level1ID |
| | Level1Name |
| | Level1DisplayName |
| | IsTransferred |
| | UpdateDateTime |

| OutboundDimMetric | |
|---|---|
| PK,I1 | MetricID |
| | MetricName |
| | MetricDisplayName |
| | UniqueMetricName |
| | MeasurePK1 |
| | MeasurePK2 |
| | MeasurePK3 |
| | RollUpAggregationType |
| | DayAggregationType |
| | ScoringPattern |
| | TypeOfMetric |
| | ToolTipText |
| | IsTransferred |
| | UpdateDateTime |

| OutboundDimLevel3 | |
|---|---|
| PK,I1 | Level3ID |
| | Level3Name |
| | Level3DisplayName |
| | IsTransferred |
| | UpdateDateTime |

| OutboundDimLevel2 | |
|---|---|
| PK,I1 | Level2ID |
| | Level2Name |
| | Level2DisplayName |
| | IsTransferred |
| | UpdateDateTime |

| OutboundDimLevel0Entity | |
|---|---|
| PK,I1 | Level0ID |
| | Level0Name |
| | Level0DisplayName |
| | UpdateDateTime |
| | IsTransferred |
| | EntityEffectiveDate |
| | EntityExpiryDate |

| SysDiagrams | |
|---|---|
| PK,I1 | diagram id |
| I2 | name |
| I2 | principal_id |
| | version |
| | definition |

| TempSLATargetData | |
|---|---|
| PK,I1 | UID |
| | ConfigID |
| | TargetLevel1 |
| | TargetLevel2 |
| | TargetLevel3 |
| | TargetLevel4 |
| | TargetProduct |
| | UpdateDateTime |

| OutageDaywiseData | |
|---|---|
| PK,I1 | DaywiseOutageData |
| | CollatedOutageID |
| | ConfigID |
| | DownEventDateTime |
| | UpEventDateTime |
| | WeightedOutageTime |
| | IsProcessed |
| | UpdateDateTime |

Staging Database Schema

Figure 11

Presentation Database Schema

Cube Schema

Figure 15

FRAMEWORK FOR PROVIDING METRICS FROM ANY DATASOURCE

CROSS-REFERENCE TO RELATED APPLICATIONS

The following application is cross-referenced and incorporated by reference herein in its entirety: U.S. patent application Ser. No. 11/740,740, entitled "BUSINESS METRICS AGGREGATED BY CUSTOM HIERARCHY", having inventors Myerson, et al., filed on Apr. 26, 2007.

BACKGROUND

Information technology (IT) systems are important to maintaining business operations. IT system health is typically monitored by the business to determine how the system is operating and whether business goals are being met. Monitoring IT system health is important to keeping the IT system reliable and effective and for providing a successful business.

Most IT monitoring systems are designed for a specific IT system. Thus, the monitoring system is usually hard coded to address specific features of the particular IT system. To make changes to the monitoring system requires significant time and resources to change the underlying code of the system. For example, changing a typical monitoring system would require a change in monitoring system code, a new executable file, or other significant and time-consuming changes to the system. It is desirable to have a flexible monitoring system for monitoring an IT system.

SUMMARY

A metrics generation system provides metrics for an IT, point of sale, manufacturing or some other computing system from different data sources in a single display. Configuration files containing parameters and instructions are loaded by the system to access different data sources. The configuration files may identify the data source location, the data to retrieve, and other information regarding data extraction. Once retrieved, the data is placed into a single data schema, processed, and placed into a metric hierarchy. The metric hierarchy is specified by a user through configuration files. The metrics generation system is flexible in that it can be changed to extract data from different IT data sources, calculate different metric information having a hierarchy of attributes, and display a variety of metric data in different formats.

Data processing and display are performed in a flexible and dynamic manner based on parameters and instructions contained in one or more configuration files. Configuration files are used to define tasks for data extraction, processing and display, set attribute values which define metrics to be calculated and displayed, and otherwise configure aspects of the middle tier and presentation tier of the present technology. The configuration files can be generated by a user manually, through an application in response to user input, as a deliverable such as an update, or some other manner.

One embodiment receives configuration files which include server extraction parameters. A unique query is generated for a first server and second server based on the server extraction parameters. The first server and second server have a different communication interface and are associated with different server extraction parameters. The first unique query is sent to the first server and the second unique query is sent to the second server. Responses having data are received from the first server and second server. The data from the response is loaded and stored in different tables having a same schema.

One embodiment includes a staging database, a presentation database and a data set generation module. The staging database receives configuration files, loads extraction parameters and metric parameters from the configuration files, extracts data from one or more data sources based on the extraction parameters, and generates metrics based on the metric parameters. The presentation database receives metrics from the staging database and aggregates the metrics based on aggregation settings associated with each metric. The data set generation module packages data sets to be displayed. Each data set includes a portion of the aggregated metrics and is defined by metric attributes which are included in the metric parameters.

One embodiment receives configuration files which have metric calculation parameters and display parameters. Two or more sets of data are then retrieved. The data sets are associated with two or more servers based on the configuration files. Each of the two or more servers has data stored in a different schema. Metric data is then generated for each of the two or more servers from the two or more sets of data and the configuration files. The metric data is aggregated for each of the two or more servers, and the aggregated metric data is displayed based on the display parameters in the configuration files for each metric.

This summary is provided to introduce a selection of concepts in a simplified form that are further described below in the description. This summary is not intended to identify key features or essential features of the claimed subject matter, nor is it intended to be used as an aid in determining the scope of the claimed subject matter.

BRIEF DESCRIPTION OF THE DRAWINGS

FIG. 4 is an example of a hierarchy associated with a metric.

FIG. 11 is an example of a staging database schema.

FIG. 15 is an example of a user interface for displaying measurements.

DETAILED DESCRIPTION

Figure 1:
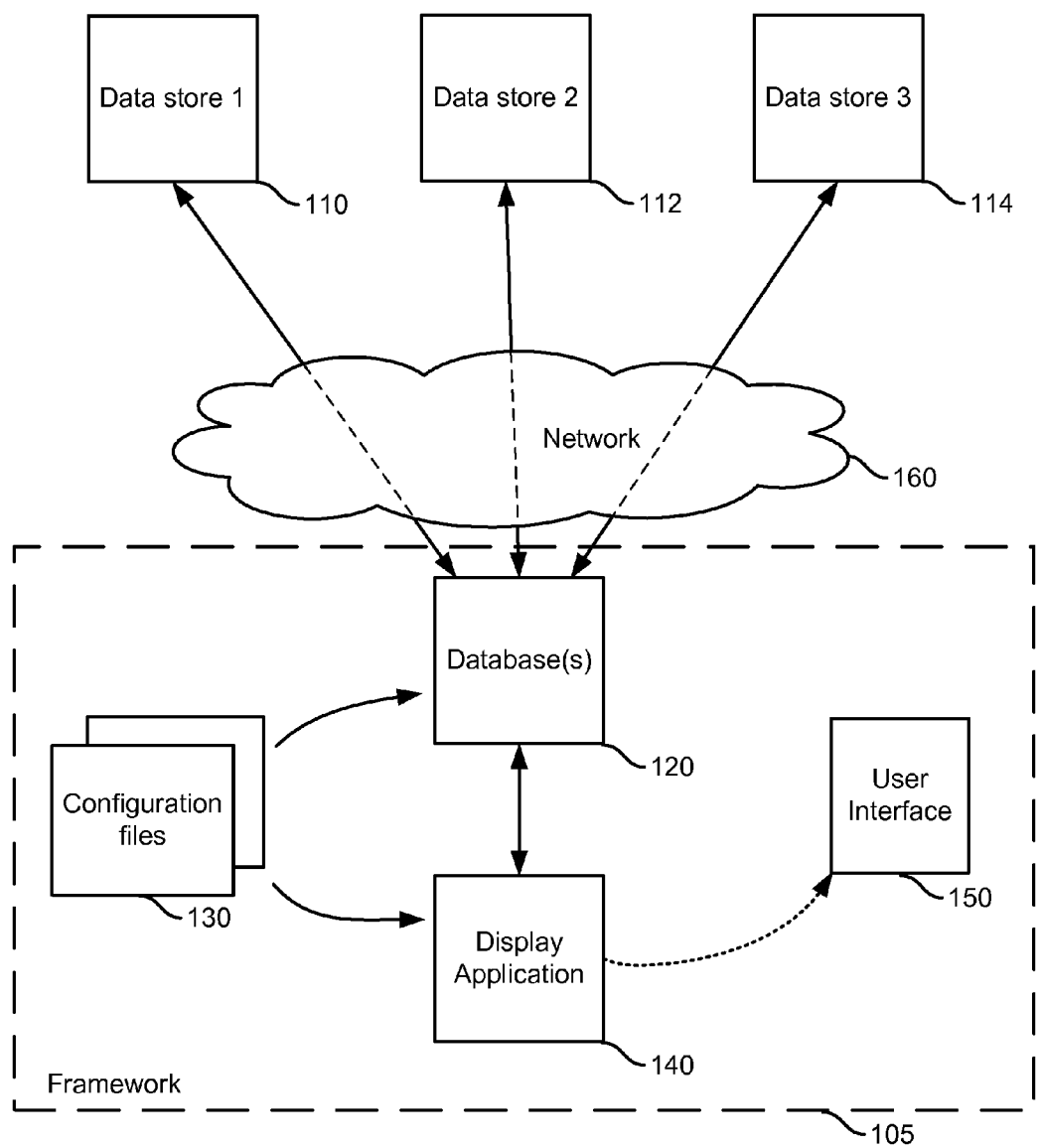
FIG. 1 is a block diagram of an embodiment of a metrics generation system.

A flexible and dynamic metrics generation system provides IT computing system metrics. The metrics generation system retrieves IT system health data, determines and aggregates metrics from the retrieved data based on user defined parameters and displays the metrics based on user preferences. The metrics generation system is flexible in that it can be changed to extract data from different IT data sources, calculate different metric information having a hierarchy of attributes, and display a variety of metric data in different formats.

Data extractions, calculations and display are performed based on parameters and instructions contained in one or more configuration files. To change how data is processed or displayed by the system involves changing the configuration files rather than system code itself. The configuration files are loaded by one or more data bases and applications of the system. Once the configuration files are loaded, the system dynamically changes how it retrieves data, processes data, and/or displays data to an administrator.

The metrics generation system includes a middle tier and a presentation tier. The middle tier includes one or more databases and other modules which extract data from one or more data sources, process the extracted data, and prepare the processed data to be displayed, all based on one or more configuration files loaded by the middle tier modules. The presentation tier receives the processed data and displays the data for a user based on configuration files having display parameters.

Configuration files are used to define tasks for data extraction, processing and display, set attribute values which define metrics to be calculated and displayed, and otherwise configure aspects of the middle tier and presentation tier of the present technology. The configuration files may be in a particular format, such as extended markup language (XML), and may generated by a user manually or through an application in response to user input. Additionally, a user may change one or more configuration files at any time before or during monitoring of an IT system. For example, in response to changing the configuration files to adjust a particular metric, the metrics generation system is updated to adjust the metric processing and display accordingly.

In some embodiments, configuration files may be comprised of backend configuration files and display configuration files. Backend configuration files may be used to configure a database layer (backend tier) which extracts, processes and stores data from one or more data sources. The display configuration files may include one or more configuration files used to configure a user interface (part of the presentation tier) and the data displayed in the user interface.

By using configuration files to specify system operating parameters rather than hard coding parameters into system modules, the system is easily expandable, flexible and dynamic. For example, data captured from monitoring an IT system may be stored in data sources having different database schema. The configuration files may include parameters and instructions to extract data from each server regardless of the schema it uses. The data from the two or more data stores is then loaded into a single schema and processed. Further, additional data stores may be easily added by manipulating the configuration files. After processing, metrics from any of the data stores may be displayed in a single user interface. This may be achieved by specifying display preferences in the display configuration files for each metric. This is discussed in more detail below.

The present technology may be applied towards an IT system, point of sales application, or some similar system. Though an IT system is referenced at points of this discussion, it is intended that other types of systems may be used as well, such as a point of sales system.

FIG. 1 illustrates a block diagram of an embodiment of a system for providing metrics for a monitored IT system. FIG. 1 includes data stores 110, 112 and 114, network 160, database 120, configuration files 130, display application 140 and user interface 150. Network 160 may be implemented as the Internet or other WAN, a LAN, intranet, extranet, private network or other network or networks. Database 120, configuration files 130, display application 140 and user interface 150 are part of framework 105 which implements the present technology.

Data stores 110-114 may contain data collected from one or more IT systems. An IT system is not illustrated in FIG. 1. Data stores 110-114 may be implemented as a variety of data stores, including "Microsoft Operations Manager Data Warehouse," (MOM) by Microsoft Corporation of Redmond, Wash. Other examples of data stores include an SMS transaction database and any other SQL server. In some embodiments, data stores 110-114 may be implemented as some other type of server.

Database 120 may be implemented as one or more databases that retrieve (extract) data from data stores 110-114, perform calculations on the retrieved data to generate and aggregate metric data, provide data to display application 140 and perform other business logic. Database 120 may extract data and otherwise communicate with data stores 110, 114, receive configuration files 130, and communicate with display application 140. Database 120 may include one or more databases.

In some embodiments, database 120 includes one or more databases that communicate with each other as well as data stores 110-114 and display application 140 using data transformation services (DTS). DTS provides a set of graphical tools and programmable objects for use with SQL servers to help administrators and developers solve data movement problems, including the extraction, transformation, and consolidation of data from disparate sources to single or multiple destinations. Sets of tasks, workflow operations, and constraints can be collected as DTS packages that can be scheduled to run periodically or when certain events occur. In some embodiments, data may be communicated between data stores 110-114, database 120 and display application 140 in some other manner. In some embodiments, communication between database 120 and data stores 110-114 may involve a different communication means or service.

Display application 140 may display metric data for an administrator of an IT system. Display application 140 receives metric data and other information from database 120 or some intermediate module between application 140 and database 120 (not illustrated in FIG. 1) and display preferences from one or more configuration files 130. Display application 140 may then display the received metric data in user interface 150 according to the preferences and details specified in one or more of configuration files 130. In some embodiments, user interface 150 may be a graphical user interface (GUI).

Configuration files 130 may include settings, instructions and other data for configuring database 120 and display application 140. The configuration files may disclose how metrics are defined, how to extract data from data stores 110-114 to generate the metrics, how to store the extracted data and generate the metrics from the stored data, and how to display the generated metrics. Configuration files 130 are described in more detail below.

Figure 2:
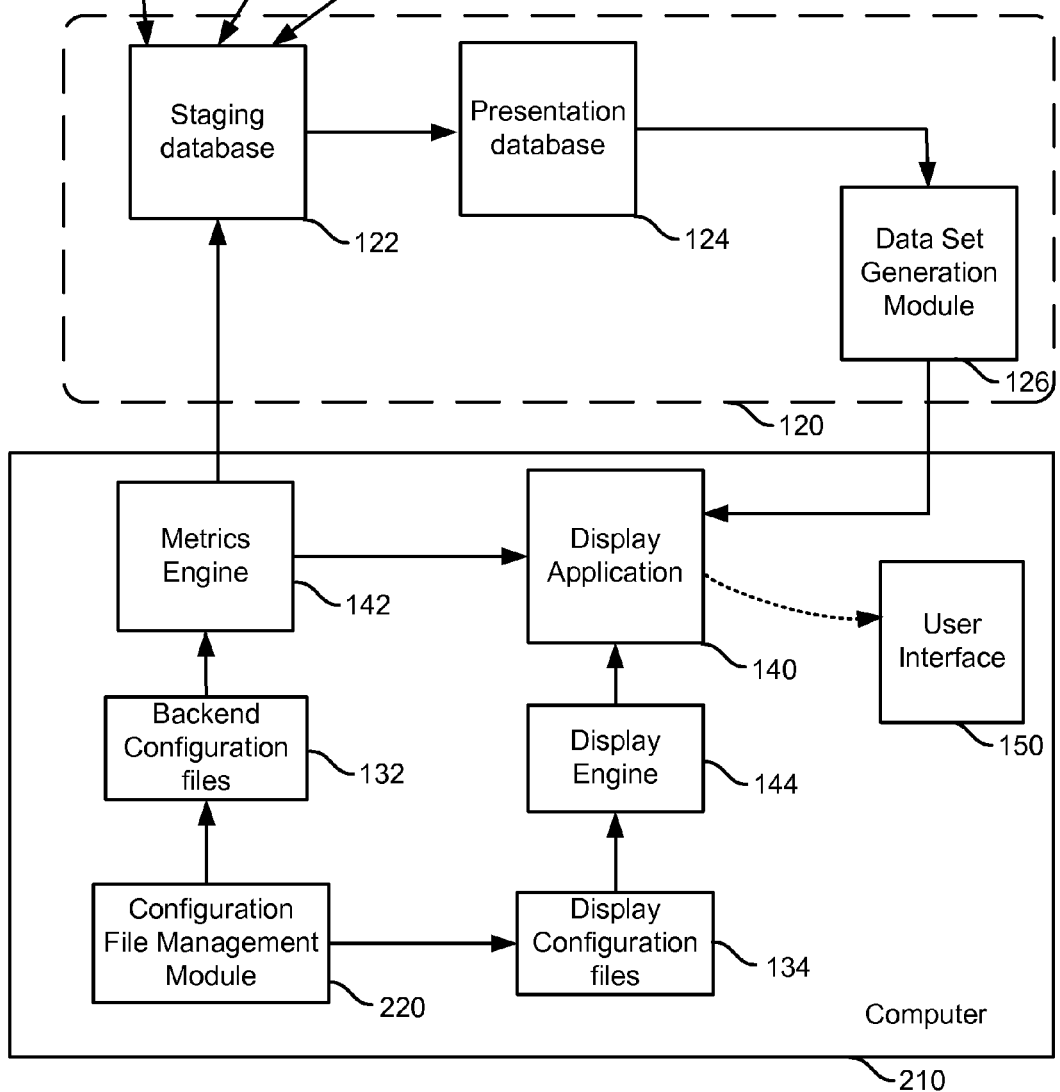
FIG. 2 is a block diagram of an embodiment of a metrics generation system.

FIG. 2 illustrates a block diagram of an embodiment of a system for providing metrics for an IT system. The system of FIG. 2 includes data stores 110-114, network 160, database 120 and computer 210. Database 120 includes staging database 122, presentation database 124 and data set generation module 126. Computer 220 includes metrics engine 142, display engine 144, backend configuration files 132, display configuration files 134, display application 140, user interface 150 and configuration file management module 220.

Staging database 122 can communicate with data sources 110-114, presentation database 124 and metrics engine 142 of computer 210. Staging database 122 may retrieve data from data sources 110-114, store the retrieved data according to business logic and server configuration settings, and process the data to generate metrics. The processed data may then be provided to presentation database 124. Data retrieval, loading, and processing by staging database 122 may be configured by backend configuration files 132.

Presentation database 124 communicates with staging database 122 and data set generation module 126. Presentation database 124 receives processed data from staging database 122, aggregates the processed data, and provides portions of the aggregated data to data set generation module 126. The data may be aggregated according to business logic of presentation database 124, one or more backend configuration files 132 and/or some other logic.

Data set generation module 126 can communicate with presentation database 124 and display application 140. Data set generation module 126 receives aggregated data from presentation database 214 and packages the data into data sets which can be easily retrieved and displayed by display application 140. The data sets may include a subset of data associated with one or more metrics to be displayed in user interface 150. The data to package within a data set may be defined in one or more display configuration files 134.

In some embodiments, the subsets of data are packaged as "data cubes." A data cube is an operator that generalizes histogram, cross-tabulation, roll-up, drill-down, and sub-total constructs. Cubes are relations, wherein a cube operator can be imbedded in non-procedural data analysis programs and treats each of N aggregation attributes as a dimension of N-space. The aggregate of a particular set of attribute values is a point in the N-space, and the set of points forms an N-dimensional cube. Cubes are discussed in more detail in "Data Cube: A Relational Aggregation Operator Generalizing Group-By, Cross-Tab and Sub-Totals," by Adam Bosworth, Surajit Chaudhuri, Jim Gray, Andrew Layman, Frank Pellow, Hamid Pirahesh, Don Reichart, and Murali Venkatrao, published in "Data Mining and Knowledge Discovery," Volume 1, pages 29-53, in May 1997, which is incorporated herein by reference.

As discussed above, database 120 of FIG. 1 may include one or more databases. The embodiment illustrated in FIG. 2 illustrates database 120 having two databases and a data set generation module. Other variations for implementing database 120 are possible.

The embodiment of FIG. 2 illustrates computer 210 including metric engine 142, display engine 144, display application 140, configuration files 132 and 134 and configuration file management module 220. In some embodiments, the elements of computer 210 may be stored one two or more computing systems which communicate with database(s) 120 of FIG. 1.

Configuration files 130 of FIG. 1 include backend configuration files 132 and display configuration files 134 displayed in FIG. 2. The backend and display configuration files may be stored in memory of computer 210. Backend configuration files 132 include settings and instructions related to retrieving or extracting data from one or more sources of IT data such as data stores 110-114, the location of data stores 110-114, how the extracted data should be stored processed into one or more metrics at staging database 122. Additionally, the backend configuration files define a hierarchy of attributes for each metric to be generated from the retrieved data. The backend configuration files 132 may be changed at any time by a user and are typically provided to stating database 122 by metrics engine 142. In some embodiments, staging database 122 may retrieve the backend configuration files periodically without metrics engine 142. As with all configuration files used with the present technology, backend configuration files 132 may be in XML format or some other format.

Display configuration files 134 may be stored on computer 210 and include settings related to displaying data and metrics in user interface 150. Display configuration files 132 may be in XML format or some other format.

Metrics engine 142 may access backend configuration files 132 and communicate with staging database 122, presentation database 124 and optionally display application 140. The metrics engine may configure staging database 122 to extract and process data contained in data stores 110-114, presentation database 124 to aggregate the processed data, and optionally display application 140 to display data with settings and logic derived from the accessed backend configuration files 132. In some embodiments, metrics engine 142 accesses configuration files and provides them to stating database 122 periodically, in response to a request from staging database 122 or in response to administrator input.

Display engine 144 provides configuration file settings to display application 140. Display engine 144 is comprised of code that accesses display configuration files 134, generates display tasks and provides the tasks and other display configuration file data to display application 140.

Configuration File management application 220 may be implemented as code which is used to generate, edit and maintain backend configuration files 132 and display configuration files 134. For example, configuration file management application 220 may include an XML editor, a text editor, or some other application for generating configuration files. The configuration file management application may also be implemented as a file manager which handles configuration file requests from metrics engine 142, display engine 144, staging database 122, presentation database 124 and data set generation module 126. In some embodiments, backend configuration files 132 and display configuration files 134 are stored in memory and retrieved by engines 142 and 144 without configuration file management module 220. Configuration file management application 220 is optional.

Figure 3:
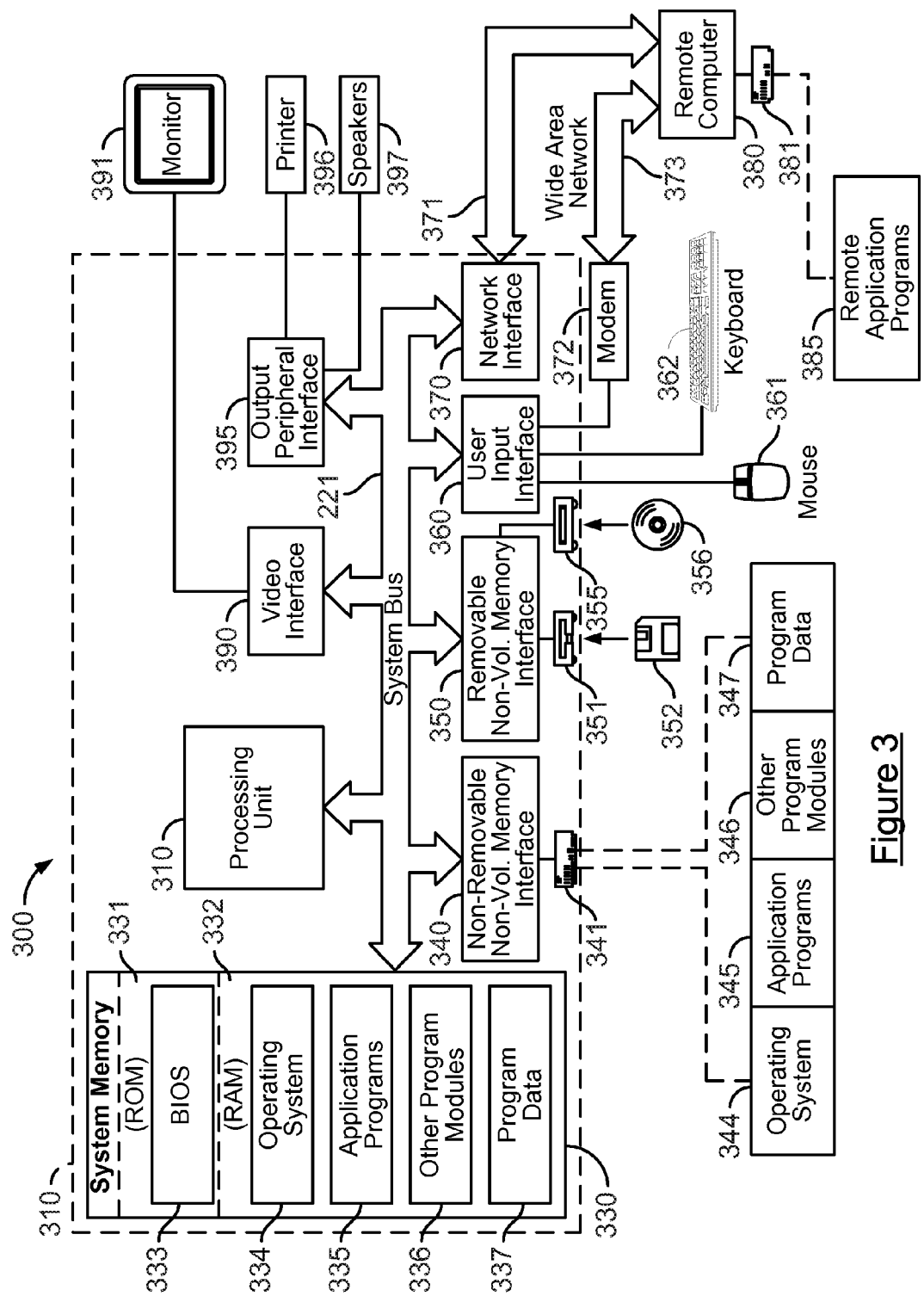
FIG. 3 is an example of a computing environment for implementing the present technology.

FIG. 3 illustrates an embodiment of a computing environment for implementing the present technology. In one embodiment, the computing environment of FIG. 3A provides more detail for data stores 110-114, database 120, staging database 122, presentation database 124, display application 140 and computer 210.

Computing environment 300 of FIG. 3 is only one example of a suitable computing environment and is not intended to suggest any limitation as to the scope of use or functionality of the technology herein. Neither should the computing environment 300 be interpreted as having any dependency or requirement relating to any one or combination of components illustrated in the exemplary operating environment 300.

The technology described herein is operational with numerous other general purpose or special purpose computing system environments or configurations. Examples of well known computing systems, environments, and/or configurations that may be suitable for use with the technology herein include, but are not limited to, personal computers, server computers, hand-held or laptop devices, mobile phones or devices, multiprocessor systems, microprocessor-based systems, set top boxes, programmable consumer electronics, network PCs, minicomputers, mainframe computers, distributed computing environments that include any of the above systems or devices, and the like.

The technology herein may be described in the general context of computer-executable instructions, such as program modules, being executed by a computer. Generally, program modules include routines, programs, objects, components, data structures, and so forth that perform particular tasks or implement particular abstract data types. The technology herein may also be practiced in distributed computing environments where tasks are performed by remote processing devices that are linked through a communications network. In a distributed computing environment, program modules may be located in both local and remote computer storage media including memory storage devices.

With reference to FIG. 3, an exemplary system for implementing the technology herein includes a general purpose computing device in the form of a computer 310. Components of computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 310 typically includes a variety of computer readable media. Computer readable media can be any available media that can be accessed by computer 310 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 310. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 3 illustrates operating system 334, application programs 335, other program modules 336, and program data 337.

The computer 310 may also include other removable/non-removable, volatile/nonvolatile computer storage media. By way of example only, FIG. 3 illustrates a hard disk drive 340 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 3, provide storage of computer readable instructions, data structures, program modules and other data for the computer 310. In FIG. 3, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 30 through input devices such as a keyboard 362 and pointing device 361, commonly referred to as a mouse, trackball or touch pad. Other input devices (not shown) may include a microphone, joystick, game pad, satellite dish, scanner, or the like. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. In addition to the monitor, computers may also include other peripheral output devices such as speakers 397 and printer 396, which may be connected through an output peripheral interface 390.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 3. The logical connections depicted in FIG. 3 include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example, and not limitation, FIG. 3 illustrates remote application programs 385 as residing on memory device 381. It will be appreciated that the network connections shown are exemplary and other means of establishing a communications link between the computers may be used.

A metric or measurement (sometimes collectively referred to herein as metrics) identified by the present technology may be associated with a hierarchy. The hierarchy may have one or more levels of attributes. The attributes may provide more information for the metric or describe a subset of a metric.

FIG. 4 is an example of a hierarchy associated with a metric. In particular, FIG. 4 illustrates an exemplary hierarchy format and an example of actual data in the hierarchy format. The exemplary hierarchy format includes a first level of "Product" and a second level of "metric." Below the metric level are five attribute levels, each of which identifies an attribute "type." Each attribute type may be anything that a user wishes to use to group or categorize metric data. For example, a user may wish to group data by attribute types of office, server, user group, location, or some other logical group. The five attribute levels in the example hierarchy format are given example attribute types of forest, region, domain, building and entity/server.

The example hierarchy in FIG. 4 provides example values for the hierarchy format. The product level is the highest level of the hierarchy and represents the product for which the metric is calculated. The illustrated example for product is "Exchange 2003," a server type. In some embodiments, no aggregation is done for the product level.

The metric level is the level below the product level and represents the actual metric for which reports are generated. The example metric value in FIG. 4 is "Exchange Server 2003 availability." In addition to having a value, each metric hierarchy may have other information associated with it, such as an aggregation type. The aggregation type for a metric determines how data below the metric level are rolled up into higher levels. Types of aggregation may include sum, average, minimum and maximum of the data points for the metric. The aggregation type for the example in FIG. 4 is set to average as indicated by "avg." Other types of aggregation methods may be used with the present technology as well.

Each metric level has a number of attribute levels below it, most of which are optional. Each attribute level identifies an aspect of the metric which represents a subset of the total data for the metric. For example, the optional attribute types illustrated in FIG. 4 are forest, region, domain, building and entity/server. The example value for each attribute is a "North America" forest, "Corp" region, "Redmond" domain, and "RC-4" building. Data may be aggregated for each of these attribute levels (levels 4-1). When aggregating data for a particular level, the aggregation type value for the metric level is accessed. In the example hierarchy of FIG. 4, aggregating Exchange Server 2003 Availability for all "Corp" regions would be done by averaging the metrics. The level 0 attribute, the last attribute, is the server or entity itself. In the example illustrated, the level 0 attribute has a value of "Exchange Server 7." The metric hierarchy levels, including the attribute types, and the values for each hierarchy may be defined in one or more backend configuration files.

Figure 5:
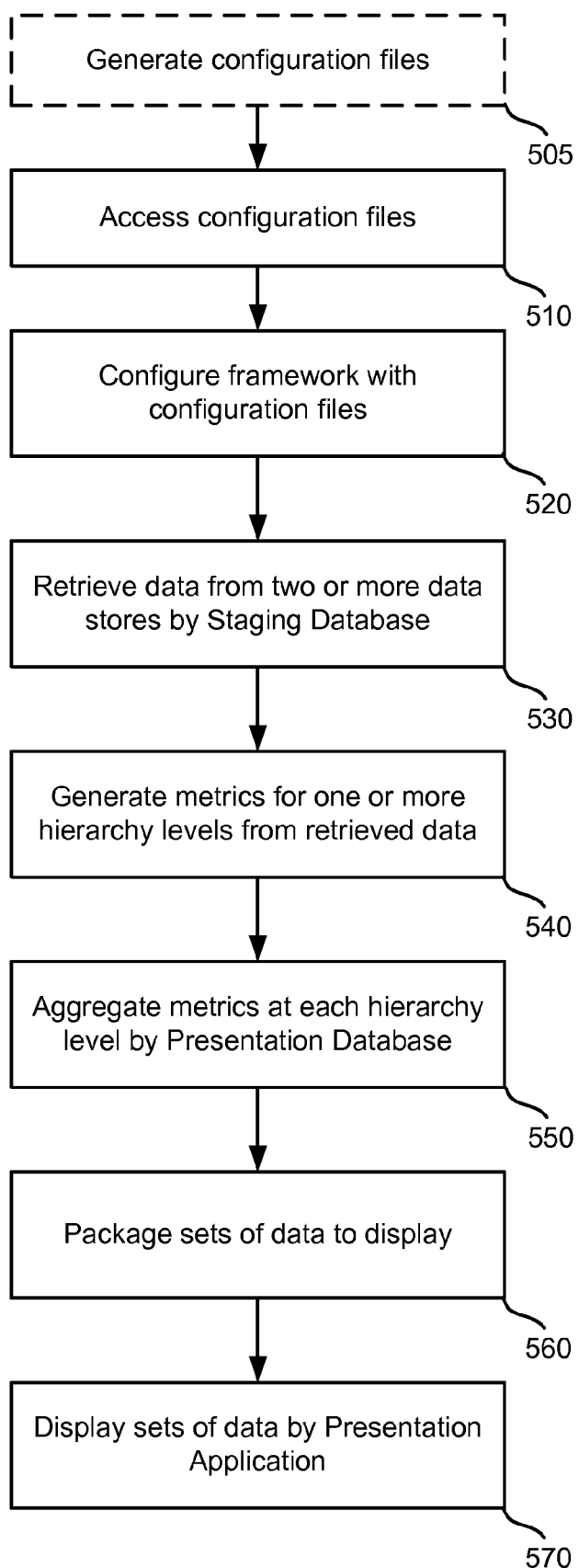
FIG. 5 is a flowchart of an embodiment of a process for displaying metrics.

FIG. 5 illustrates a flowchart of an embodiment of a process for displaying metrics. First, configuration files 130 are generated at step 505. Configuration files 130 may be generated manually or through configuration file management module 220 by a user or in some other manner. In some embodiments, the configuration files could be delivered or updated by a company. Generation of configuration files 130 of FIG. 1 may include generating one or more backend configuration files 132 and/or display configuration files 134. In some embodiments, the generation of configuration files 130 may be performed at any time. Thus step 505 may occur at the beginning of the process of FIG. 5 or at any other time during the process. Additionally, configuration files may be edited or updated at any point during the process of FIG. 4. For example, a company may send an update to the configuration files to a customer using the present technology.

Configuration files 130 are accessed at step 510. Accessing the files may include metrics engine 142 retrieving the backend configuration files 132 and providing them to staging database 122 and display engine 144 retrieving display configuration files and providing them to display application 140. In some embodiments, both staging database 122 and display application 144 may access configuration files from their stored location, such as local memory of computer 210 or some other location.

Next, framework 105 is configured with the accessed configuration files at step 520. Configuration of framework 105 may include generating extraction tasks, measurement calculation tasks and other tasks and setting of various properties for staging database 122, presentation database 124 and data set generation module 126. Configuration of framework 105 may also include generation of display templates, parameters and other settings for display application 140. Configuring a framework with configuration files at step 520 is discussed in more detail below with respect to the process of FIG. 6.

Data is retrieved from one or more data stores by staging database 122 at step 530. The data is retrieved or "extracted" by staging database 122 according to settings and tasks configured based on one or more configuration files. Retrieving data from two or more data stores by staging database 122 is discussed in more detail below with respect to the process of FIG. 8.

After retrieving the data, metrics are generated from the retrieved data at step 540. In some embodiments, the metrics are generated according to backend configuration files 132 by staging database 122. Each metric may have one or more descriptors or other parameters associated with the metric. The metric parameters may be associated with a hierarchy. In some embodiments, metric data may be generated for each level of hierarchy for each metric. An example of a schema which describes the levels of a hierarchy associated with a metric is illustrated and discussed in more detail below with respect to FIG. 10. Generating metrics for one or more hierarchy levels from retrieved data is discussed in more detail below with respect to the process of FIG. 8.

Figure 12:
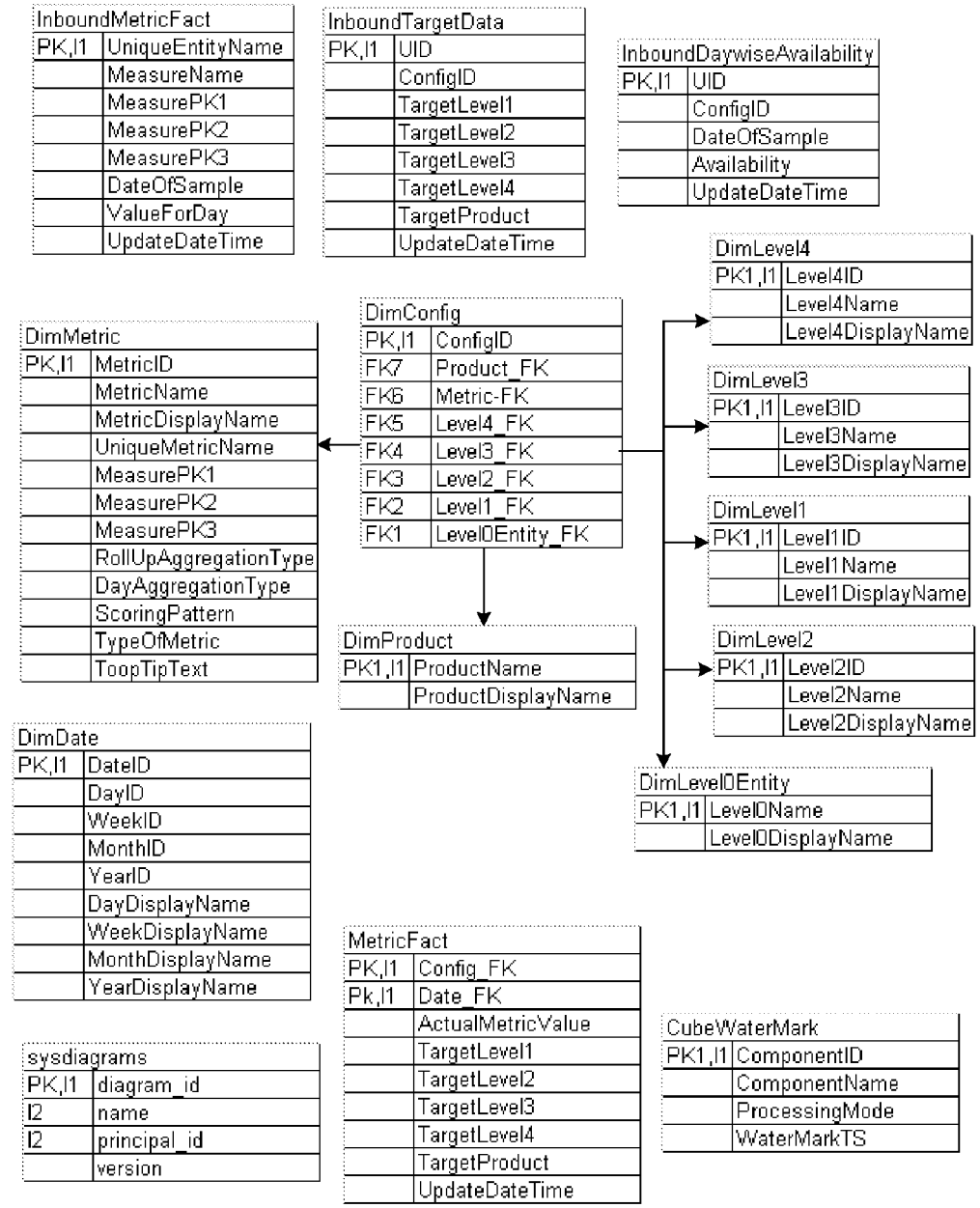
FIG. 12 is an example of a presentation database schema.

Next, metrics are aggregated at each hierarchy level by presentation database 124 at step 550. In some embodiments, data may be retrieved from one or more of data sources 110-114 several times over a period of time. The data retrieved over time is processed into metrics and aggregated into a table format. Metrics may be aggregated for each hierarchy level, or metric attribute type, for a particular metric. The aggregated data is stored a presentation database 124. An example of a schema which describes tables in which metrics may be aggregated is illustrated in FIG. 12 and discussed in more detail below.

Figure 13:
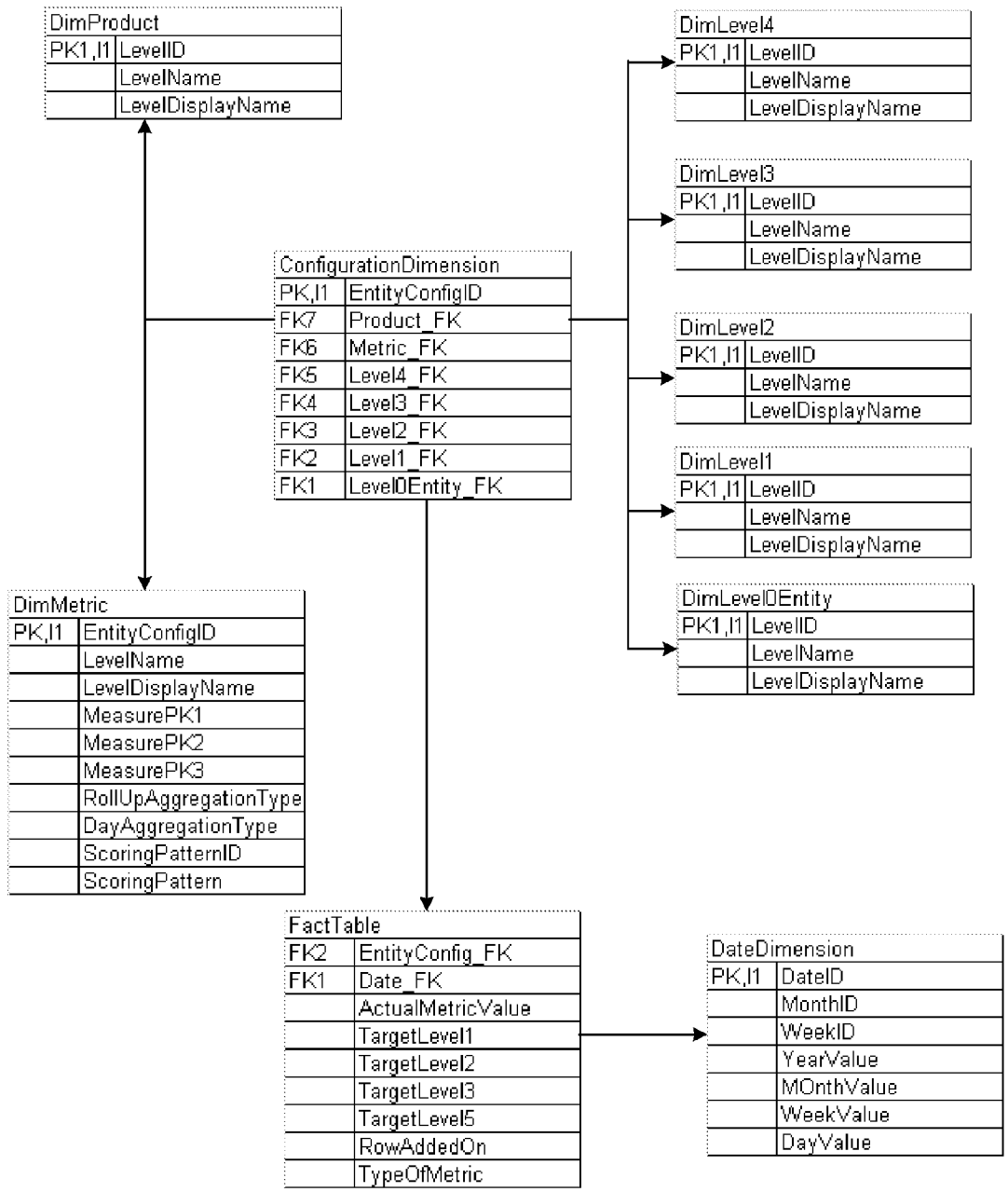
FIG. 13 is an example of a cube schema.

After aggregating metrics, sets of data are packaged for display at step 560. In some embodiments, the sets of data to display are packaged into a file which can be accessed and processed by display application 140. The file may be compressed or otherwise generated to efficiently contain a set of data to display through user interface 150. In some embodiments, the set of data may be packaged as a three dimensional data cube. In this embodiment, the aggregated data is sent to data set generation module 126 which generates the data cube. Sets of data may be placed in a data cube according to a cube schema. An exemplary cube schema is illustrated in FIG. 13 and discussed in more detail below.

Sets of data are displayed by display application 140 at step 570. Display application 140 receives sets of data from data set generation module 126 and displays the data as driven by display engine 144. The display parameters and settings for displaying the data are derived from display configuration files 134. Display application 140 provides the data in user interface 150. The data may be provided as one or more metrics associated with the health of one or more IT systems. Displaying data in step 470 is discussed in more detail with respect to the process of FIG. 10.

Steps 560 and 570 represent steps implemented as part of a presentation layer of the present technology. In some embodiments, the presentation layer can be separated by businesses or application. Thus, there may be more than one display mechanism for different types of displayed data and information.

Figure 6:
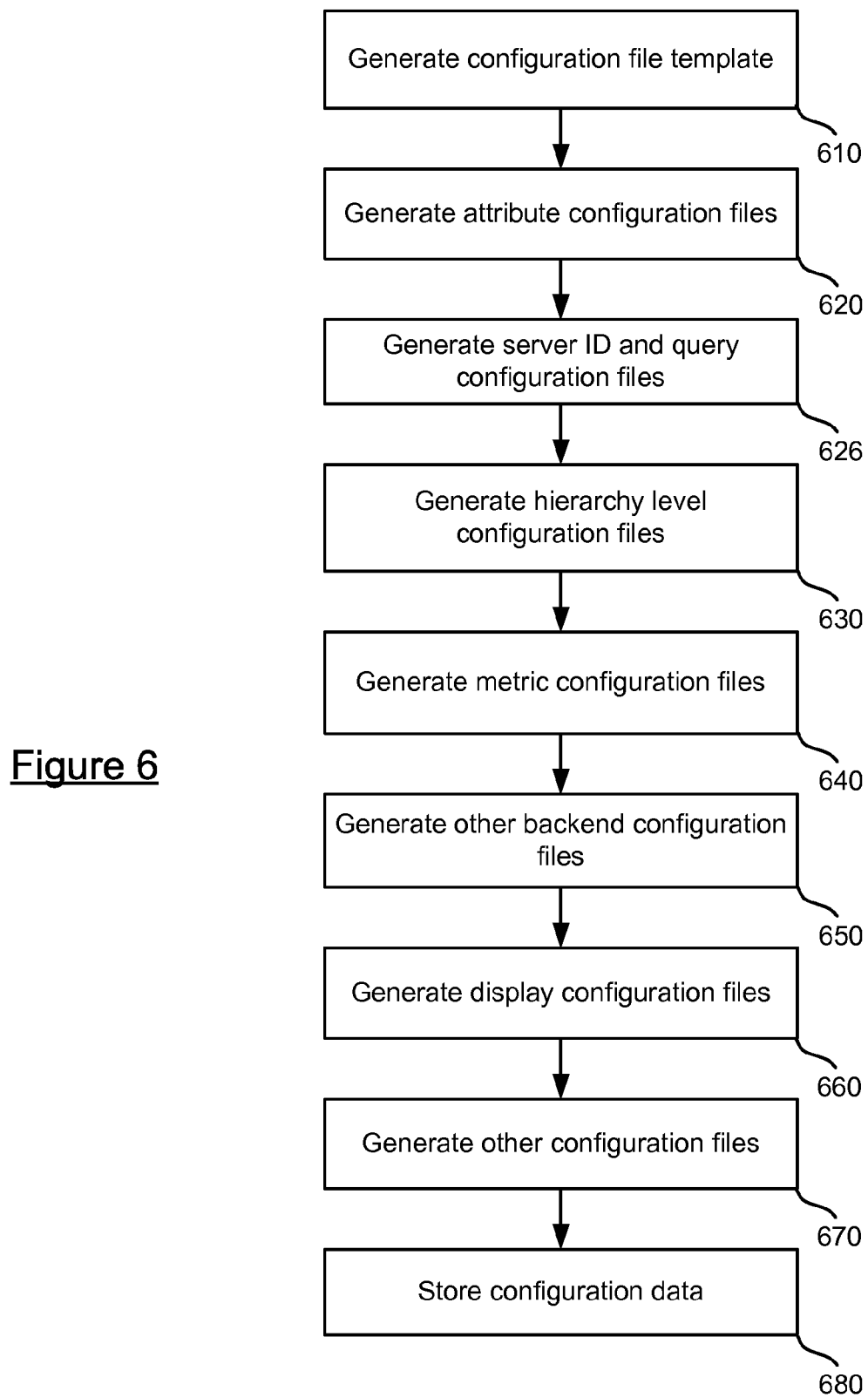
FIG. 6 is a flowchart of an embodiment of a process for generating configuration files.

FIG. 6 is a flowchart of an embodiment of a process for generating configuration files. In some embodiments, the process of FIG. 6 provides more detail for step 505 of the process of FIG. 5. First, a configuration file template is generated at step 510. The template may be generated by configuration file management module 220. The configuration file template may have default data which is provided by framework 105 or configured by a user. In some embodiments, when configuration file management module 220 is used, the configuration files generated in steps 520-570 may be generated from the default file generated at step 610.

Attribute configuration files are generated at step 620. In some embodiments, the attributes data may define a hierarchy associated with each metric, wherein each hierarchy may have a number of levels comprised of attributes. An example of an XML configuration file which specifies attributes is shown below.

```
<SLASERVERCONFIG Schema="4.0">
- <ATTRIBUTEDETAIL>
- <ATTRIBUTE ATTRIBUTECLASSNAME="BusinessUnit"
 ATTRIBUTECLASSDISPLAYNAME="BusinessUnit" ISHIDDEN="TRUE">
   <ATTRIBUTELIST ATTRIBUTEVALUENAME="BusinessUnit_1"
 ATTRIBUTEVALUEDISPLAYNAME="BU1" ISHIDDEN="FALSE" />
   <ATTRIBUTELIST ATTRIBUTEVALUENAME="BusinessUnit_2"
 ATTRIBUTEVALUEDISPLAYNAME="BU2" ISHIDDEN="FALSE" />
   <ATTRIBUTELIST ATTRIBUTEVALUENAME="BusinessUnit_3"
 ATTRIBUTEVALUEDISPLAYNAME="BU3" ISHIDDEN="FALSE" />
   </ATTRIBUTE>
- <ATTRIBUTE ATTRIBUTECLASSNAME="Service"
 ATTRIBUTECLASSDISPLAYNAME="Service" ISHIDDEN="TRUE">
   <ATTRIBUTELIST ATTRIBUTEVALUENAME="Service_1"
 ATTRIBUTEVALUEDISPLAYNAME="Platinum" ISHIDDEN="FALSE" />
   <ATTRIBUTELIST ATTRIBUTEVALUENAME="Service_2"
 ATTRIBUTEVALUEDISPLAYNAME="Gold" ISHIDDEN="FALSE" />
   <ATTRIBUTELIST ATTRIBUTEVALUENAME="Service_3"
 ATTRIBUTEVALUEDISPLAYNAME="Silver" ISHIDDEN="FALSE" />
   </ATTRIBUTE>
- <ATTRIBUTE ATTRIBUTECLASSNAME="Type"
 ATTRIBUTECLASSDISPLAYNAME="Type" ISHIDDEN="FALSE">
   <ATTRIBUTELIST ATTRIBUTEVALUENAME="Type_1"
 ATTRIBUTEVALUEDISPLAYNAME="Bridgehead" ISHIDDEN="FALSE" />
   <ATTRIBUTELIST ATTRIBUTEVALUENAME="Type_2"
 ATTRIBUTEVALUEDISPLAYNAME="Gateway" ISHIDDEN="FALSE" />
   <ATTRIBUTELIST ATTRIBUTEVALUENAME="Type_3"
 ATTRIBUTEVALUEDISPLAYNAME="Frontend" ISHIDDEN="FALSE" />
   <ATTRIBUTELIST ATTRIBUTEVALUENAME="Type_4"
 ATTRIBUTEVALUEDISPLAYNAME="Mailbox" ISHIDDEN="FALSE" />
   </ATTRIBUTE>
- <ATTRIBUTE ATTRIBUTECLASSNAME="Region"
 ATTRIBUTECLASSDISPLAYNAME="Region" ISHIDDEN="FALSE">
   <ATTRIBUTELIST ATTRIBUTEVALUENAME="Region_1"
 ATTRIBUTEVALUEDISPLAYNAME="Corp" ISHIDDEN="FALSE" />
   <ATTRIBUTELIST ATTRIBUTEVALUENAME="Region_2"
 ATTRIBUTEVALUEDISPLAYNAME="WinDeploy" ISHIDDEN="FALSE" />
   <ATTRIBUTELIST ATTRIBUTEVALUENAME="Region_3"
 ATTRIBUTEVALUEDISPLAYNAME="WinSE" ISHIDDEN="FALSE" />
   </ATTRIBUTE>
   </ATTRIBUTEDETAIL>
   </SLASERVERCONFIG>
```

The attributes XML configuration file above specifies attribute class names of business unit, service, type and region. Each attribute class has attribute values and display names. The BusinessUnit attribute class has values of BusinessUnit_1, BusinessUnit_2 and BusinessUnit_3 which are displayed as BU1, BU2 and BU3. The Service attribute class has values of Service_1, Service_2 and Service_3 which are displayed as Platinum, Gold and silver, respectfully. The Type attribute class has values of type_1, type_2, type_3 and type_4 which are displayed as Bridgehead, Gateway, Frontend and Mailbox. Finally, the Region attribute class has values of Region_1, Region_2 and Region_3 which are displayed as Corp, WinDeploy and WinSE.

Server identification configuration files and server query configuration files are generated at step 625. Server identification configuration files identify a name and location information for a source of data. An example of a configuration file that contains database connection data is below.

```
<SLASERVERCONFIG Schema="4.0">
- <DATABASECONNECTION>
- <DATASOURCE ID="MOM_EVENTDATA_TRANSFER">
    <DBSERVER NAME="abc-momrep-123" DBNAME="SystemCenterReporting" />
  </DATASOURCE>
- <DATASOURCE ID="MOM_SAMPLENUMERICDATA_TRANSFER">
    <DBSERVER NAME="abc-momrep-123" DBNAME="SystemCenterReporting" />
  </DATASOURCE>
- <DATASOURCE ID="LDAP_DATA_TRANSFER">
    <DBSERVER NAME="SLADemo" DBNAME="IIS-LDAPDatabase" />
  </DATASOURCE>
- <DATASOURCE ID="IIS_DATA_TRANSFER">
    <DBSERVER NAME="SLADemo" DBNAME="IIS-LDAPDatabase" />
  </DATASOURCE>
- <DATASOURCE ID="IIS_PERCENT_PERMONTH_DATA_TRANSFER">
    <DBSERVER NAME="SLADemo" DBNAME="IIS-LDAPDatabase" />
  </DATASOURCE>
  </DATABASECONNECTION>
  </SLASERVERCONFIG>
```

The database connection configuration file above specifies attributes of data source identifications (IDs), each of which is associated with a database server name and database name. For example, the first data source specified has a data source ID of "MOM_EVENTDATA_TRANSFER." This data source is on the data server named "abc-momrep-123" and the database name "SystemCenterReporting." The third data source specified has a data source ID of "LDAP_DATA_TRANSFER," is located on database server called "SLADemo" and in a database named "IIS-LDAPDatabase."

An example of a query configuration file is shown below.

```
<SLASERVERCONFIG Schema="4.0">
- <QUERY ID="MOM_SAMPLENUMERICDATA_TRANSFER_MAPI_QUERY"
    DATASOURCEID="MOM_SAMPLENUMERICDATA_TRANSFER_MAPI"
    NAME="SAMPLENUMERICDATATRANSFER"
    SOURCETYPE="SAMPLENUMERICDATA">
- <![CDATA[
    select
        ComputerName_PK as 'UniqueEntityName',
        CounterName_PK 'MeasureName',
        SampleValue 'SampleValue',
        DateTimeSampled 'DateOfSample',
        DateTimeSampled 'DateOfSampleSTZ',
        Getdate( ) 'UpdateDateTime'
    from
    (
    SELECT
        d2.ComputerName_PK,
        N'Total Email Transactions' CounterName_PK,
        cast(1 as decimal(38,3)) AS SampleValue,
        f1.DateTimeSampled
    FROM
        SC_SampledNumericDataFact_Table f1 WITH (NOLOCK)
        JOIN SC_CounterDetailDimension_Table d1 WITH (NOLOCK)
        ON f1.CounterDetail_FK = d1.SMC_InstanceID
        JOIN SC_ComputerDimension_Table d2 WITH (NOLOCK)
        ON f1.Computer_FK = d2.SMC_InstanceID
        WHERE d1.ObjectName_PK = N'Exchange MP' AND d1.CounterName_PK =
    N'MAPI Mail Flow - Latency (seconds)'
    )MAPI
  ]]>
- <![CDATA[
  ]]>
- <DATAMAPPING>
    <UNIQUEENTITYNAME COLUMNNAME="ComputerName_PK"
      COLUMNALIAS="UniqueEntityName" />
    <MEASURENAME COLUMNNAME="CounterName_PK"
      COLUMNALIAS="MeasureName" />
    <MEASURE_PK1 COLUMNNAME="" COLUMNALIAS="" />
    <MEASURE_PK2 COLUMNNAME="" COLUMNALIAS="" />
    <MEASURE_PK3 COLUMNNAME="" COLUMNALIAS="" />
    <SAMPLEVALUE COLUMNNAME="SampleValue"
      COLUMNALIAS="SampleValue" />
    <DATETIMEOFSAMPLE COLUMNNAME="DateTimeSampled"
      COLUMNALIAS="DateOfSample" />
    <DATETIMEOFSAMPLESTZ COLUMNNAME="DateTimeSampled"
      COLUMNALIAS="DateOfSampleSTZ" />
    <UPDATEDATETIME COLUMNNAME="GetDate( )"
```

```
COLUMNALIAS="UpdateDateTime" />
    </DATAMAPPING>
- <![CDATA[
    ]]>
    </QUERY>
- <QUERY ID="MOM_EVENTDATA_TRANSFER_QUERY"
DATASOURCEID="MOM_EVENTDATA_TRANSFER"
NAME="EVENTDATATRANSFER" SOURCETYPE="EVENTDATA">
- <![CDATA[
        SELECT
            d2.ComputerName_PK 'UniqueEntityName',
            d1.EventID_PK 'EventID',
            d1.EventSource_PK 'EventSource',
            F1.EventMessage 'EventMessage',
            F1.DateTimeGenerated 'DateTimeOfEvent',
            F1.DateTimeGenerated 'DateTimeOfEventSTZ',
            Getdate( ) 'UpdateDateTime'
        FROM
        SC_EventFact_Table F1 WITH (NOLOCK) JOIN
SC_EventDetailDimension_Table d1 WITH (NOLOCK)
            on F1.EventDetail_FK = d1.SMC_InstanceID
            JOIN SC_ComputerDimension_Table d2 WITH (NOLOCK)
            on F1.Computer_FK = d2.SMC_InstanceID
]]>
- <DATAMAPPING>
    <UNIQUEENTITYNAME COLUMNNAME="d2.ComputerName_PK"
COLUMNALIAS="UniqueEntityName" />
    <EVENTID COLUMNNAME="d1.EventID_PK" COLUMNALIAS="EventID" />
    <EVENTSOURCE COLUMNNAME="d1.EventSource_PK"
COLUMNALIAS="EventSource" />
    <EVENTMESSAGE COLUMNNAME="F1.EventMessage"
COLUMNALIAS="EventMessage" />
    <DATETIMEOFEVENT COLUMNNAME="F1.DateTimeGenerated"
COLUMNALIAS="DateTimeOfEvent" />
    <DATETIMEOFEVENTSTZ COLUMNNAME="F1.DateTimeGenerated"
COLUMNALIAS="DateTimeOfEventSTZ" />
    <UPDATEDATETIME COLUMNNAME="GetDate( )"
COLUMNALIAS="UpdateDateTime" />
    </DATAMAPPING>
- <![CDATA[
    ]]>
    </QUERY>
    </SLASERVERCONFIG>
```

The query configuration file includes a query identification portion and data mapping portion for each query. The query identification portion includes the name of the data source to query, the type of data to query, the query to send to the data source, and data mapping information for the query. The data mapping information indicates mappings of the retrieved data to display headings.

Hierarchy level configuration files are generated at step 630. In some embodiments, each server is associated with one or more attributes. For example, a server may contain mailbox data and be located in Los Angeles. Thus, the server could be associated with a geographical attribute of "California" because Los Angeles is in California. A portion of a level group configuration file which indicates levels of a hierarchy associated with one or more metrics is below.

```
<SLASERVERCONFIG Schema="4.0">
- <LEVELGROUP NUMBER="5" ID="EXCHANGE_LG5">
- <LEVEL NUMBER="5" ID="EXCHANGE_L5_MPR_LEVEL" LEVELDESC="MPR
Level" NAME="Exchange" DISPLAYNAME="MPR Level Exchange">
- <ENTITY ID="EXCHANGE_MPR_DUMMY_ENTITY"
ENTITYDESC="EXCHANGE_MPR_DUMMY_ENTITY"
UNIQUEENTITYNAME="EXCHANGE_MPR_DUMMY_ENTITY"
ENTITYDISPLAYNAME="EXCHANGE_MPR_DUMMY_ENTITY">
    <EFFECTIVESTARTDATE MONTH="1" DAY="23" YEAR="2005" />
    </ENTITY>
    </LEVEL>
- <LEVEL NUMBER="5" ID="EXCHANGE_L5_BRIDGEHEAD"
DISPLAYNAME="EXCHANGE_BRIDGEHEAD" NAME="Exchange"
LEVELDESC="BRIDGEHEAD">
- <LEVELGROUP NUMBER="4"
ID="EXCHANGE_LG4_BRIDGEHEAD_REGION">
- <LEVEL NUMBER="4" ID="EXCHANGE_L4_BRIDGEHEAD_CORP"
DISPLAYNAME="CORP" NAME="CORP" LEVELDESC="CORP">
- <LEVELGROUP NUMBER="3"
ID="EXCHANGE_LG3_BRIDGEHEAD_CORP_FOREST">
```

```
- <LEVEL NUMBER="3"
ID="EXCHANGE_L3_BRIDGEHEAD_CORP_NORTHAMERICA"
DISPLAYNAME="NORTHAMERICA" NAME="NORTHAMERICA"
LEVELDESC="NORTHAMERICA">
- <LEVELGROUP NUMBER="2"
ID="EXCHANGE_LG2_BRIDGEHEAD_CORP_NORTHAMERICA_DOMAIN">
- <LEVEL NUMBER="2"
ID="EXCHANGE_L2_BRIDGEHEAD_CORP_NORTHAMERICA_REDMOND"
DISPLAYNAME="REDMOND" NAME="REDMOND"
LEVELDESC="REDMOND">
- <ENTITY
ID="EXCHANGE_EXCHANGE_L2_BRIDGEHEAD_CORP_NORTHAMERICA_REDMOND_TUK-HUB-01"
ENTITYDESC="TUK-HUB-01"
UNIQUEENTITYNAME="TUK-HUB-01" ENTITYDISPLAYNAME="TUK-HUB-
01">
    <EFFECTIVESTARTDATE MONTH="1" DAY="1" YEAR="2006" />
- <AVAILABILITYCONFIGGROUP
ID="EXCHANGE_CONFIGGROUP_EXCHANGE_L2_BRIDGEHEAD_CORP_NORTH
AMERICA_REDMOND_TUK-HUB-01">
- <AVAILABILITYCONFIG
ID="EXCHANGE_CONFIG_EXCHANGE_L2_BRIDGEHEAD_CORP_NORTHAMERICA_REDMOND_TUK-HUB-01"
ENTITYSTARTSTATE="STARTED">
- <WEIGHTIDENTIFIERLIST>
  <WEIGHT
ID="EXCHANGE_WEIGHT_EXCHANGE_L2_BRIDGEHEAD_CORP_NORTHAMERICA_REDMOND_TUK-
HUB-01_SG1_TUK-HUB-01_MBX_STORE_1A"
NAME="SG1\TUK-HUB-01 MBX StoreA" />
  </WEIGHTIDENTIFIERLIST>
  </AVAILABILITYCONFIG>
  </AVAILABILITYCONFIGGROUP>
  </ENTITY>
  </LEVEL>
  </LEVELGROUP>
  </LEVEL>
  </LEVELGROUP>
  </LEVEL>
  </LEVELGROUP>
  </LEVEL>
</SLASERVERCONFIG>
```

The level group configuration file portion above indicates levels of a hierarchy for a metrics. In particular, the level group configuration file identifies a base level (level number 4) of "EXCHANGE_L5_BRIDGEHEAD." The next level is identified as a region of "CORP." The next level, level 3, is identified as a forest level attribute having a value of "NORTHAMERICA." The last level is a domain attribute having a value of "REDMOND." After identifying the level types, availability configuration and weight information are identified. Though attribute levels of region, forest and domain are illustrated in the above example, any attribute type can be used.

Metric configuration files are generated at step 640. Metric configuration files may identify a particular metric, the events at which it is measured, how the data for the metric is provided, how to provide information regarding metric measurements (as opposed to an aggregation of data), how to aggregate the metric calculations, and other information. An example of a portion of a metric configuration file is below.

```
<SLASERVERCONFIG Schema="4.0">
- <METRICGROUP ID="MG1">
- <!--
    -->
- <AVAILABILITY ID="EXCHANGEROLE_MAILBOX_AVAILABILITY"
LEVELID="EXCHANGE_L5_MAILBOX"
EVENT_DATATRANSFERID="MOM_EVENTDATA_TRANSFER"
METRICDISPLAYNAME="Exchange Mailbox Availability"
UNIQUEMETRICNAME="Exchange Mailbox Availability" TOOLTIPTEXT="The %
of time Mailbox Servers are available (Availability = (Total Time - Outage Time) / Total
Time)" TRENDTYPE="INCREASINGBETTER"
DIMENSIONROLLUPTYPE="WTAVERAGE" AGGREGATIONTYPE="AND"
METRICTYPE="BOTH" AVAILABILITYTYPE="NORMAL">
- <OUTAGEEVENTS>
- <EVENTPAIR ISPLANNED="TRUE">
- <START>
    <EVENT EVENTID="9539" EVENTSOURCE="MSExchangeIS Mailbox Store"
TEXTIDENTITY="FALSE" SEARCHTEXT=""
MATCHEVENTPAIRTEXT="FALSE"
EVENTMATCHFUNCTIONID="GETDBNAMEFUNC" />
```

```
      </START>
    <FINISH>
      <EVENT EVENTID="9523" EVENTSOURCE="MSExchangeIS Mailbox Store"
TEXTIDENTITY="FALSE" SEARCHTEXT=""
MATCHEVENTPAIRTEXT="FALSE"
EVENTMATCHFUNCTIONID="GETDBNAMEFUNC" />
    </FINISH>
  </EVENTPAIR>
  <EVENTPAIR ISPLANNED="TRUE">
    <START>
      <EVENT EVENTID="1069" EVENTSOURCE="ClusSvc"
TEXTIDENTITY="TRUE" SEARCHTEXT="Information Store"
MATCHEVENTPAIRTEXT="FALSE"
EVENTMATCHFUNCTIONID="GETVSNAMEFUNC" />
    </START>
    <FINISH>
      <EVENT EVENTID="9523" EVENTSOURCE="MSExchangeIS Mailbox Store"
TEXTIDENTITY="FALSE" SEARCHTEXT=""
MATCHEVENTPAIRTEXT="FALSE"
EVENTMATCHFUNCTIONID="GETDBNAMEFUNC" />
    </FINISH>
  </EVENTPAIR>
  <EVENTPAIR ISPLANNED="TRUE">
    <START>
      <EVENT EVENTID="1069" EVENTSOURCE="ClusSvc"
TEXTIDENTITY="TRUE" SEARCHTEXT="System Attendant"
MATCHEVENTPAIRTEXT="FALSE"
EVENTMATCHFUNCTIONID="GETVSNAMEFUNC" />
    </START>
    <FINISH>
      <EVENT EVENTID="9523" EVENTSOURCE="MSExchangeIS Mailbox Store"
TEXTIDENTITY="FALSE" SEARCHTEXT=""
MATCHEVENTPAIRTEXT="FALSE"
EVENTMATCHFUNCTIONID="GETDBNAMEFUNC" />
    </FINISH>
  </EVENTPAIR>
  <!--
  -->
  <EVENTPAIR ISPLANNED="TRUE">
    <START>
      <EVENT EVENTID="16008" EVENTSOURCE="EventLog"
TEXTIDENTITY="FALSE" SEARCHTEXT=""
MATCHEVENTPAIRTEXT="FALSE" EVENTMATCHFUNCTIONID="" />
    </START>
    <FINISH>
      <EVENT EVENTID="6005" EVENTSOURCE="EventLog"
TEXTIDENTITY="FALSE" SEARCHTEXT=""
MATCHEVENTPAIRTEXT="FALSE" EVENTMATCHFUNCTIONID="" />
    </FINISH>
  </EVENTPAIR>
  <EVENTPAIR ISPLANNED="TRUE">
    <START>
      <EVENT EVENTID="6006" EVENTSOURCE="EventLog"
TEXTIDENTITY="FALSE" SEARCHTEXT=""
MATCHEVENTPAIRTEXT="FALSE" EVENTMATCHFUNCTIONID="" />
    </START>
    <FINISH>
      <EVENT EVENTID="6005" EVENTSOURCE="EventLog"
TEXTIDENTITY="FALSE" SEARCHTEXT=""
MATCHEVENTPAIRTEXT="FALSE" EVENTMATCHFUNCTIONID="" />
    </FINISH>
  </EVENTPAIR>
  </OUTAGEEVENTS>
</AVAILABILITY>
<AVAILABILITY ID="EXCHANGEROLE_FRONTEND_AVAILABILITY"
LEVELID="EXCHANGE_L5_FRONTEND"
EVENT_DATATRANSFERID="MOM_EVENTDATA_TRANSFER"
METRICDISPLAYNAME="Exchange Frontend Availability"
UNIQUEMETRICNAME="Exchange Frontend Availability" TOOLTIPTEXT="The %
of time FrontEnd Servers are available (Availability = (Total Time - Outage Time) / Total
Time)" TRENDTYPE="INCREASINGBETTER"
DIMENSIONROLLUPTYPE="WTAVERAGE" AGGREGATIONTYPE="AND"
METRICTYPE="STANDALONE" AVAILABILITYTYPE="NORMAL">
  <OUTAGEEVENTS>
  <EVENTPAIR ISPLANNED="TRUE">
    <START>
      <EVENT EVENTID="16008" EVENTSOURCE="EventLog"
TEXTIDENTITY="FALSE" SEARCHTEXT=""
MATCHEVENTPAIRTEXT="FALSE" EVENTMATCHFUNCTIONID="" />
    </START>
```

```xml
 <FINISH>
   <EVENT EVENTID="6005" EVENTSOURCE="EventLog"
TEXTIDENTITY="FALSE" SEARCHTEXT=""
MATCHEVENTPAIRTEXT="FALSE" EVENTMATCHFUNCTIONID="" />
   </FINISH>
   </EVENTPAIR>
 <EVENTPAIR ISPLANNED="TRUE">
 <START>
   <EVENT EVENTID="6006" EVENTSOURCE="EventLog"
TEXTIDENTITY="FALSE" SEARCHTEXT=""
MATCHEVENTPAIRTEXT="FALSE" EVENTMATCHFUNCTIONID="" />
   </START>
 <FINISH>
   <EVENT EVENTID="6005" EVENTSOURCE="EventLog"
TEXTIDENTITY="FALSE" SEARCHTEXT=""
MATCHEVENTPAIRTEXT="FALSE" EVENTMATCHFUNCTIONID="" />
   </FINISH>
   </EVENTPAIR>
 <EVENTPAIR ISPLANNED="TRUE">
 <START>
   <EVENT EVENTID="7036" EVENTSOURCE="Service Control Manager"
TEXTIDENTITY="TRUE" SEARCHTEXT="The World Wide Web Publishing Service
service entered the stopped state." MATCHEVENTPAIRTEXT="FALSE"
EVENTMATCHFUNCTIONID="" />
   </START>
 <FINISH>
   <EVENT EVENTID="7036" EVENTSOURCE="Service Control Manager"
TEXTIDENTITY="TRUE" SEARCHTEXT="The World Wide Web Publishing Service
service entered the running state." MATCHEVENTPAIRTEXT="FALSE"
EVENTMATCHFUNCTIONID="" />
   </FINISH>
   </EVENTPAIR>
   </OUTAGEEVENTS>
   </AVAILABILITY>
</METRICGROUP>
   </SLASERVERCONFIG>
```

The metric XML configuration file above defines a first metric "EXHANGEROLE_MAILBOX_AVAILABILITY" and a second metric "EXHANGEROLE_FRONTEND_AVAILABILITY" within metric group "MG1." Each metric is associated with information regarding the metric display name, the trend of the metric (whether the metric tends to increase over time or decrease), how the metric is aggregated, the type of metric, outage information indicating the start and end of an outage for a metric, and other information. The trend (TrendType) of the metric is used for comparison against a target set for that metric. If TrendType is set to "IncreasingIsBetter," then a given metric value greater than the target will be considered "green" or "above SLA". For TrendType "DecreasingIsBetter," a given value will be "green" if it has a value below the assigned target.

Other backend configuration files are generated at step 650. Other backend configuration files may identify metric targets, form configuration files that provide a list of all possible values for a hierarchy, and other files.

Display configuration files are generated at step 660. In some embodiments, several types of display configuration files may be used, including weekly measures, weekly metrics, monthly measures, monthly measures, Display XML, total measure and total metrics display configuration files. Each display configuration file may include an identification of the particular display, data configuration information over which the data applies, identification of the metric to be displayed, and other information. An example of a home weekly measures scorecard configuration file is below.

```xml
 <METRICSSCORECARDCONFIG TITLE="Exchange Weekly Measures"
DATEDISPLAYMODE="ON" DISPLAYTARGET="FALSE" VIEWPANE="FALSE"
DISPLAYURLBUTTON="FALSE" REPORTURL="MetricReport.aspx">
 <SCORECARD NAME="HomeExchangeMeasuresWeeklyScorecard"
DESCRIPTION="scorecard V2" DISPLAYENTITY="FALSE"
TEMPLATESCORECARD="MetricsScorecard"
TEMPLATEKPI="WeeklyTemplateKPI">
 <SCORECARDVIEW NAME="HomeExchangeMeasuresWeeklyScorecard View"
TEMPLATESCORECARDVIEW="WeeklyTemplateScorecardView">
 <DATECONFIG TYPE="WEEK" RELATIVE="TRUE" NUMPERIODS="3">
   <DATEVAL MONTH="03" DAY="25" YEAR="2006" />
   <DATEVAL MONTH="04" DAY="03" YEAR="2006" />
   <DATEVAL MONTH="05" DAY="02" YEAR="2006" />
   </DATECONFIG>
 <METRICS>
 <!--
   <METRIC ID="NUMBER_OF_TOTAL_MAILBOXES_USER_AND_SYSTEM"
DECIMALS="3"/>
   -->
```

-continued

```
<METRIC ID="EXCHANGE_NUMBER_OF_MAILBOX" DECIMALS="3" />
<METRIC ID="EXCHANGE_AVERAGE_MAILBOX_SIZE" DECIMALS="3" />
<METRIC ID="EXCHANGE_TOTAL_MAILBOX_CONTENT" DECIMALS="3" />
<METRIC
ID="EXCHANGE_NUMBEROF_MAX_USERS_LARGEST_EXCHANGE_SERVER"
DECIMALS="3" />
<METRIC ID="EXCHANGE_SMTP_INTERNET_MSG_RECEIVED"
DECIMALS="3" />
<METRIC ID="EXCHANGE_SMTP_EXCHANGE_MSG_DELIVERED"
DECIMALS="3" />
</METRICS>
</SCORECARDVIEW>
</SCORECARD>
</METRICSSCORECARDCONFIG>
```

The home weekly measures scorecard configuration file above identifies the metrics to be displayed on a home page or start page for the "Exchange" data source. The metrics displayed include "EXCHANGE_NUMBER_OF_MAILBOX," "EXCHANGE_AVERAGE_MAILBOX_SIZE," "EXCHANGE_TOTAL_MAILBOX_CONTENT," EXCHANGE_NUMBEROF_MAX_USERS_LARGEST_EXCHANGE_SERVER," "EXCHANGE_SMTP_INTERNET_MSG_RECEIVED" and "EXCHANGE_SMTP_EXCHANGE_MSG_DELIVERED."

Other XML configuration files are generated at step 670. The additional XML configuration files may provide more information regarding data extraction, processing, aggregation or display, or provide other information for configuring framework 105. For example, data set processing tasks may be generated which generate and provide data sets to be displayed from aggregated metrics. After XML configuration files have been configured, the files are stored at step 680. The XML configuration files may be stored on local memory of computer 210, at a location over a network and accessible to computer 210, or some other location.

The configuration files discussed with respect to the process of FIG. 6 are for examples of different types of files that may be used to configure a metrics processing and display system such as that of framework 105. Other and/or additional configuration files may be used to configure the system as well.

Figure 7:
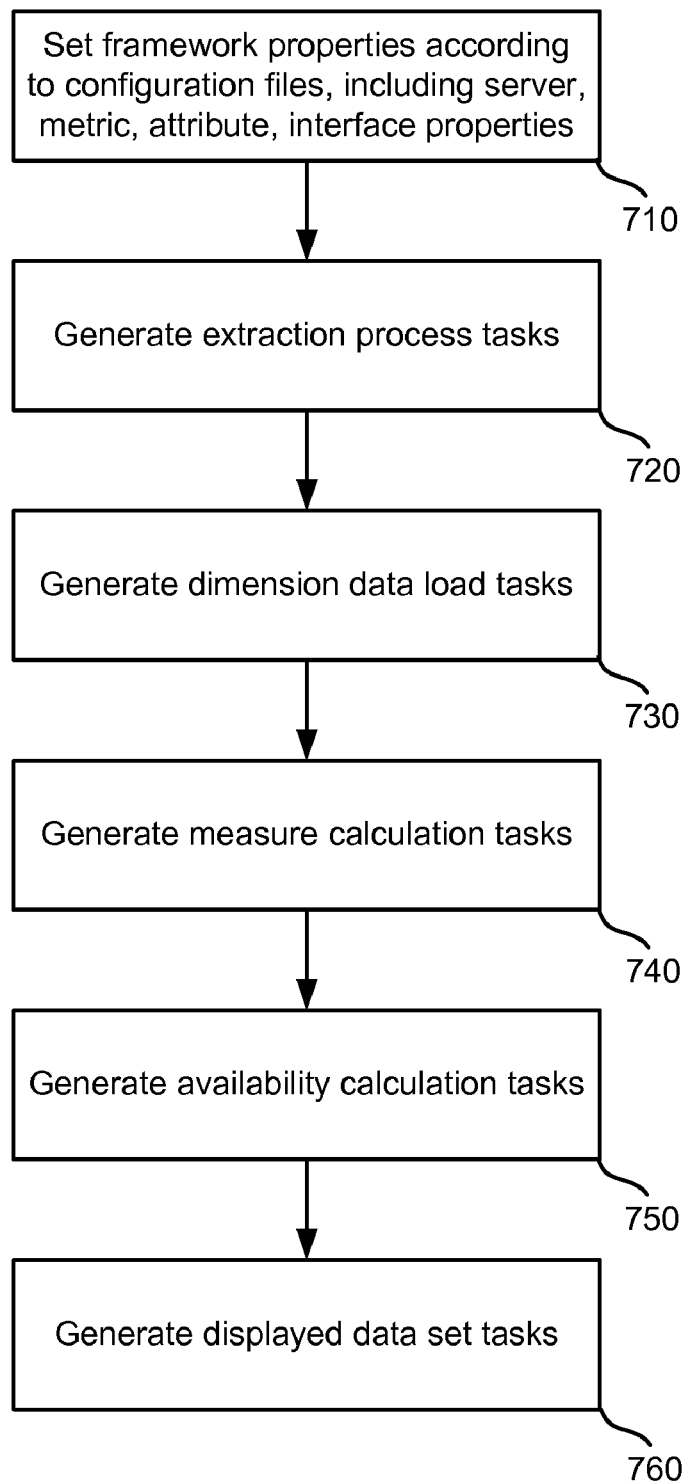
FIG. 7 is a flowchart of an embodiment of a process for configuring a framework with configuration files.

FIG. 7 is a flowchart of an embodiment of a process for configuring a framework 105 with XML configuration files. In some embodiments, the process of FIG. 7 provides more detail for step 520 of the process of FIG. 5. First, framework properties may be set according to configuration files 130, including server, metric, attribute and display interface properties set in XML configuration files 132 and 134 at step 710. The framework properties may indicate the location of configuration properties 132 and 134, the location of staging database 122 and presentation database 124, identification of the general metric hierarchy levels, and other general system configuration properties.

Next, extraction process tasks are generated at step 720. The extraction process tasks may generate a request for one or more data sources, such as an SQL server. The query may be generated from backend configuration files 132, such as one or more database connections configuration files and one or more query configuration files discussed above. The extraction tasks and related data are generated and stored at staging database 122. Generating the tasks may include creating tables and/or allocating memory in which to store extracted data within staging database 122. Examples of schema for storing data in staging database 122 are illustrated in FIG. 11 and discussed in more detail below.

Dimension data load tasks are generated at step 730. Dimension data load tasks handle loading of the extracted data into tables of staging database 122. The tables are configured using the schema illustrated and described below with respect to FIG. 11. For example, dimension data load tasks may include loading extracted data into one or more hierarchy levels of a metric as described by the outbound dimension level tables of the staging database schema.

Next, measure calculation tasks are generated at step 740. The measure calculation tasks may describe how to calculate a measured value of an element. For example, a measure calculation task may determine the total number of times that a condition or event occurs, such as the number of times a connection attempt is blocked. The measure calculation task indicates the data that is needed to determine the measure and where the store the result of the measure. Availability calculation tasks are generated at step 750. Similar to measure calculations, an availability calculation task may determine the availability of an element as a percentage of a series of data points having a certain value. For example, Exchange Mailbox availability may be determined as a percentage of time that the service is available over a period of one month. Next, the displayed data set tasks are generated at step 760. Displayed data set tasks may access generated data cubes to be displayed in user interface 150 by display application 140, indicate how user interface 150 should be provided, indicate the data to provide in the interface, and perform other tasks.

Figure 8:
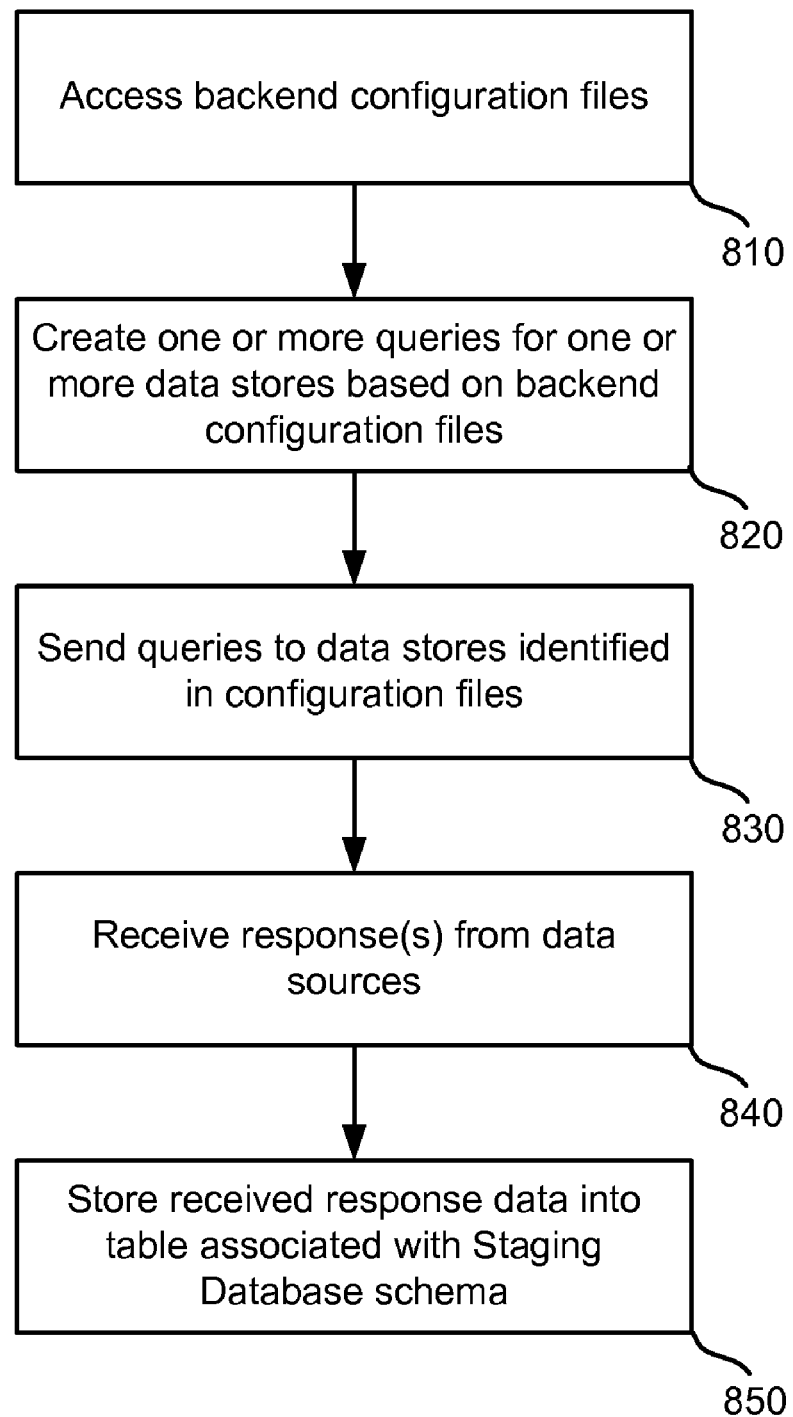
FIG. 8 is a flowchart of an embodiment of a process for retrieving data by a staging database.

FIG. 8 is a flowchart of an embodiment of a process for retrieving data by a staging database. In some embodiments, the process of FIG. 8 provides more detail of step 530 of the process of FIG. 5. First, backend configuration files are accessed at step 810. The backend configuration files may be retrieved from module 220, computer 210, locally from staging database 122, or some other location. In some embodiments, the configuration files may be accessed by metrics engine 142 and provided to staging database 122. In yet other embodiments, step 810 is optional, and the backend configuration files are already accessed at step 510 and loaded into staging database at step 520.

One or more queries are created for one or more data stores 110-114 based on the backend configuration files at step 820. The one or more queries may indicate a data store location, data server name, database name, the data to retrieve, and optionally other information. The queries may be generated from the extraction process tasks generated at step 720, backend configuration files, staging database 122 settings, and other information. In some embodiments, the queries may be generated as SQL queries.

The generated queries generated at step 820 are sent to one or more of data stores 110-114 at step 830. Once a query is sent to a data store, the data store receives the query, processes the query, generates a response and sends the response to staging database 122. Processing the query may include retrieving data from one or more databases within the queried server and packaging the retrieved data in a query response. For example, the response may include IT health data that can be used to generate availability and measurement metrics to be displayed in user interface 150. Next, one or more responses are received from the data sources at step 840. The query responses are received by staging database 122. In some embodiments, a query may be sent periodically, such as every fifteen minutes, every hour, once a day, or some other time period. As a result, a corresponding response can be received from the data source for each query sent.

The received response data is stored into tables associated within staging database 122 according to the staging database schema at step 850. For example, the data may be stored in an inbound measures table or an inbound event table. Once stored, the extraction of data from data stores 110-114 is complete.

Figure 9:
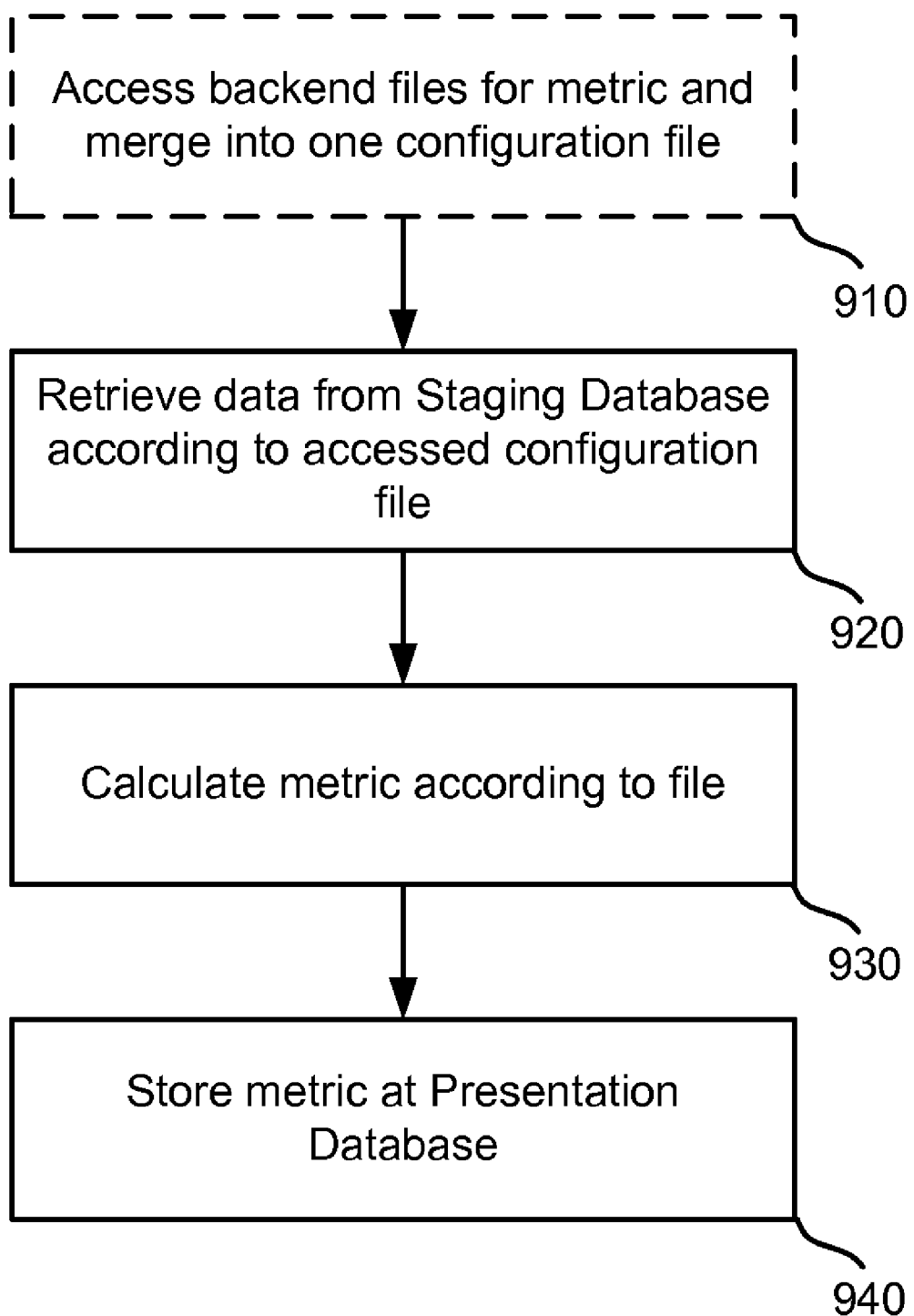
FIG. 9 is a flowchart of an embodiment of a process for generating metrics by a presentation database.

FIG. 9 is a flowchart of an embodiment of a process for generating metrics by presentation database 124. In one embodiment, the process of FIG. 9 provides more detail for step 540 of the process of FIG. 5. First, backend configuration files 132 are accessed for each metric to be generated at step 910. The configuration files can be merged into one XML configuration file. In some embodiments, the backend XML files are merged into one XML configuration file for metrics to be generated to reduce processing. The backend configuration files accessed may include metric group configuration files, level group configuration files and other configuration files. In some embodiments, step 910 may be done at different points in time within the life span of framework 105 in order to reduce overall system load.

Data is retrieved from staging database 122 according to the accessed XML configuration file at step 920. In some embodiments, the data is retrieved by measure calculation and availability calculation tasks generated at step 740 and step 750 of the process of FIG. 7. The retrieved data may include data extracted from data sources 110-114 and needed to calculate a metric.

Metrics are calculated according to the accessed XML configuration file at step 930. The calculated metrics may include availability of a particular web page, a measure of events associated with the web page, or some other metric. In some embodiments, the metric may be calculated by the measure calculation and availability calculation tasks. The calculated metrics are then stored in presentation database 124 at step 940. The metrics may be stored in tables corresponding to the staging base schema of FIG. 11. For example, the metrics may be stored in tables having a format described by the outbound dimension level schema of the schema of FIG. 11.

Figure 10:
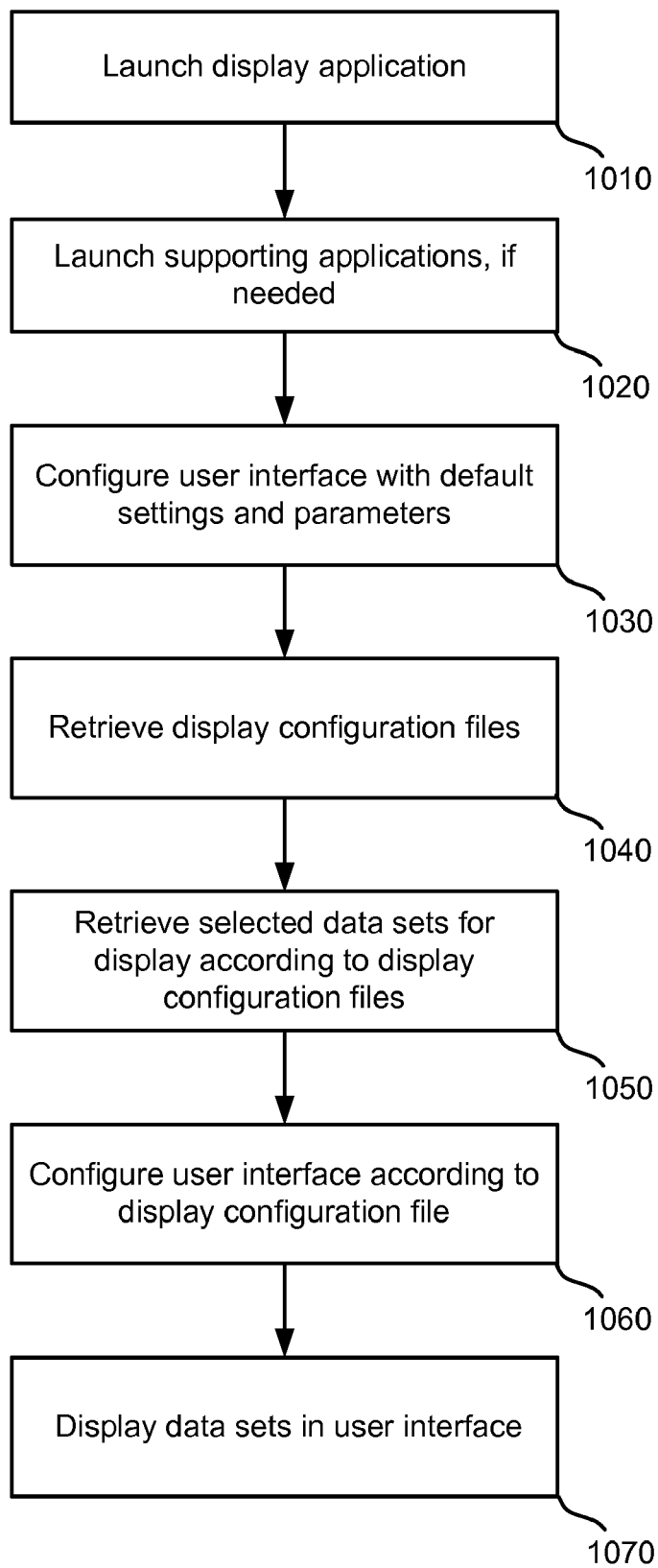
FIG. 10 is a flowchart of an embodiment of a process for displaying data by a presentation application.

FIG. 10 is a flowchart of an embodiment of a process for displaying data by a presentation application. In one embodiment, the process of FIG. 10 provides more detail of step 570 of the process of FIG. 5. First, display application 140 is launched at step 1010. In some embodiments, display application is already running, in which case step 1010 is optional. Next any supporting applications needed to display the data or prepare the data to be displayed are launched at step 1020. Supporting applications may include applications used to provide user interface 150 over a network, applications for providing metrics in the user interface, and other applications. For example, supporting applications may include "Windows SharePoint 2.0" and "Business Scorecard Manager," both by Microsoft Corporation of Redmond, Wash. Windows SharePoint may be used to provide a web portal to enable a user interface to be viewed over the Internet. Business Scorecard Manager may be used to manage graphical user interface 150.

In some embodiments, supporting applications may be part of display application 140 or a separate application not illustrated in FIG. 2.

User interface 150 is configured with default settings and parameters at step 1030. The default settings and parameters may be stored in display application 140 and relate to the metrics to display, the number of columns and rows to display, and other default settings. Display configuration files 134 are then retrieved at step 1040. The display configuration files may relate to weekly, monthly and total metrics and measurements, in addition to other display configuration files.

Selected data sets, or cubes, are then retrieved at step 1050. The data sets are retrieved from data set generation module 126 by display application 140. The data sets are selected based on data contained within XML configuration files 134 and data determined to be displayed through user interface 150. In some embodiments, the selected data sets are retrieved as one or more cubes from data set generation module 126 by display application 140. Display engine 144 may drive display application 140 to request the cubes from data set generation module 126.

Figure 14:
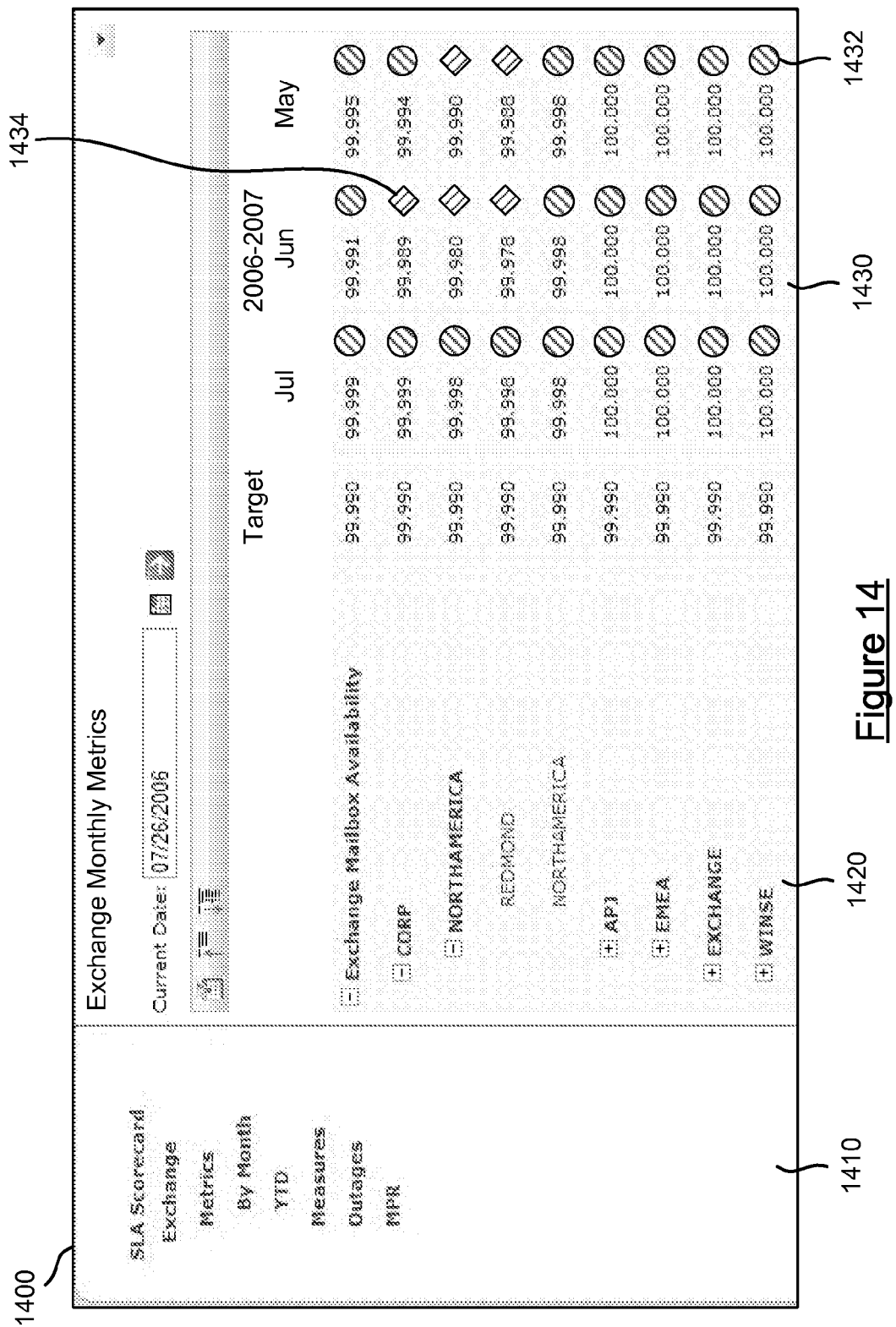
FIG. 14 is an example of a user interface for displaying metrics.
Figure 15:
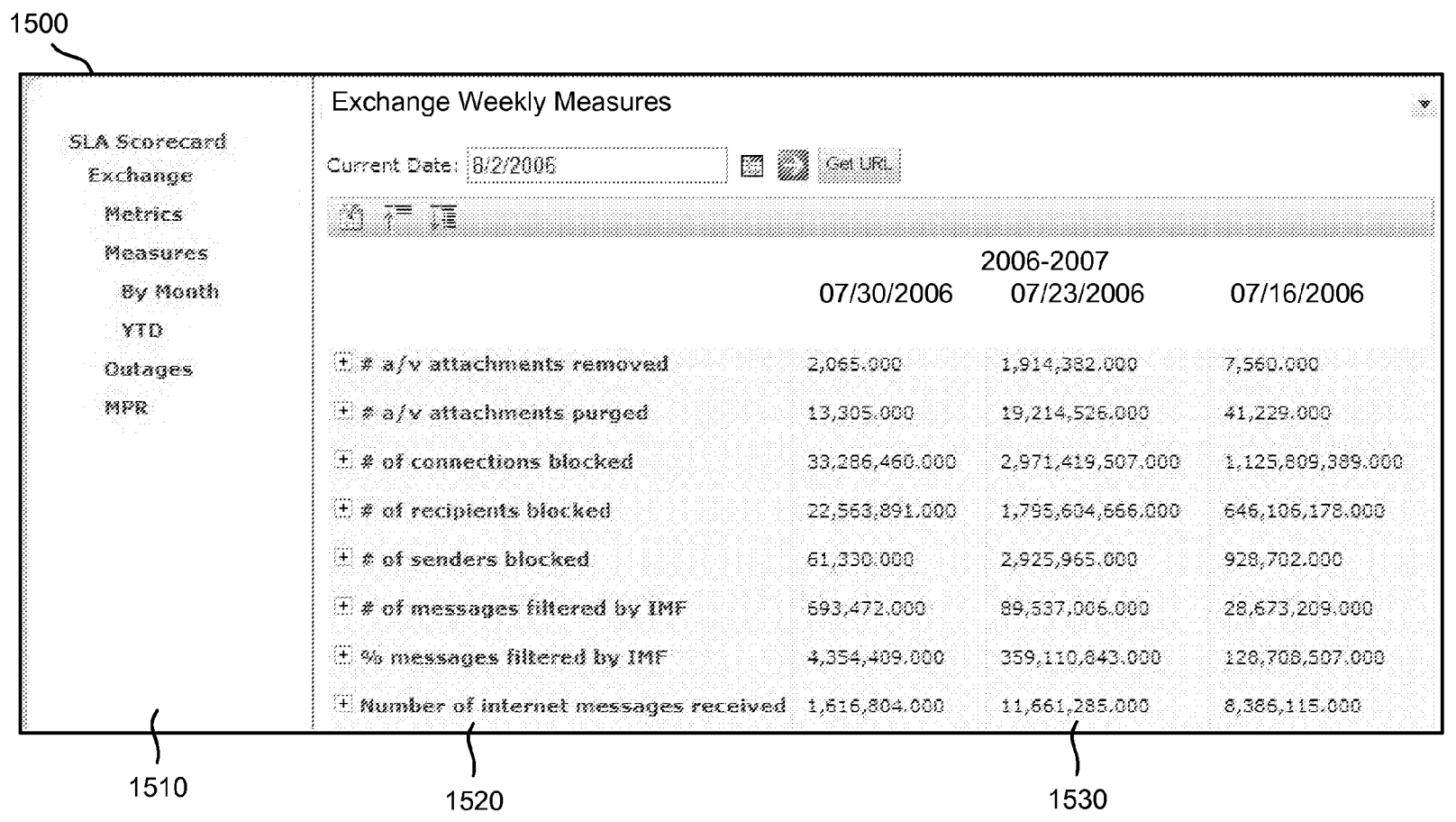

Next, user interface 150 is configured according to the display configuration files at step 1060. The configuration of user interface 150 may include how to display data, where in the interface to display data, the look and feel of the interface and other preferences. In some embodiments, user interface 150 may also be configured by displayed data set tasks generated at step 760 in the process of FIG. 7. Finally, the data sets or cubes are displayed in user interface 150 at step 1070. Data is displayed by populating the user interface with data included in the data sets (data cubes) retrieved from data set generation module 126. Examples of user interface 150 are illustrated in FIGS. 14 and 15.

FIG. 11 is an example of a staging database schema. The schema of FIG. 11 may be implemented in staging database 122. The schema includes one of more tables for inbound data, outbound dimension data, and other data. The inbound data tables include InboundMeasures and InboundEvents tables, which are populated with data extracted from data sources 110-114. InboundMeasures table holds extracted data values and timestamp data, including measured data properties (MeasurePK1-3), date the data was extracted or added to the database, and other data. The InboundEvent table holds extracted event data, such an event identifier, the source of the event, the time of the event and other data. The InboundMeasures table is used to provide measure metrics and InboundEvent data is used to provide availability data.

The outbound dimension tables of the staging database schema include OutboundDimConfig, OutboundDimProduct, OutboundDimMetric, OutboundDimLevel4, OutboundDimLevel3, OutboundDimLevel2, OutboundDimLevel1 and OutboundDimLevel0Entity tables. The OutboundDimConfig table describes the hierarchy for a particular metric, the OutboundDimMetric table describes properties of a particular metric and the OutboundDimProduct table describes a product associated with a particular metric. The OutboundDim level tables describe each hierarchy level for a particular metric. As discussed above, when extracted data is processed into metrics, the metric data is placed into the OutboundDimLevel files corresponding to the generated metric.

The other staging database schema tables include sysdiagrams, TempSLATargetData and OutageDaywiseData. These tables describe the display identifications in which a metric is displayed in, service level agreement (SLA) data for a particular metric, and outage data for a particular metric, respectfully.

FIG. 12 is an example of a presentation database schema. The presentation database schema includes tables for inbound data, dimension data, and other data. The inbound data tables include InboundMetricFact, InboundTargetData and InboundDaywiseAvailability tables. The InboundMetricFact table includes a value and time stamp for measure data as well as measure property data. The InboundTargetData table includes targets for received data, such as SLA targets. The InboundDaywiseAvailability table includes availability information for a particular metric.

The dimension data tables include DimConfig, DimMetric, DimProduct, and DimLevel4-DimLevel0 tables. The DimConfig table includes configuration information for a dimension data. The DimMetric table includes the name, aggregation type, measure properties and other information for a metric. The DimProduct table and DimLevel tables include the actual name and display name for a product and hierarchy levels (attributes) associated with a metric.

The other tables include DimDate, sysdiagrams, MetricFact and CubeWaterMark tables. The DimDate table includes identifications of time periods associated with measurement data (such as weeks, days or months during which the data was collected), the SysDiagram table includes display identification in which a metric is displayed, the MetricFact table includes data regarding SLA targets for a metric, and the CubeWaterMark table includes cube identification information for cubes to contain a particular measure data.

FIG. 13 is an example of a cube schema. The cube schema includes tables of ConfigurationDimension, DimProduct, DimMetric, FactTable, DateDimension and DimLevel4-DimLevel0. The ConfigurationDimension includes data which identifies the product, metric and level tables for a metric within a cube. The DimProduct table, DimLevel4-DimLevel1 and DimLevel0Entity tables include actual name and display name data for the product and particular metric attribute. The DimMetric table includes the value, time stamp, metric property, aggregation type and other data for a metric within a particular cube. The FactTable table includes metric, target level and other data for a metric. The DataDimension table includes identifications of time periods associated with measurement data for a particular metric within a cube (such as weeks, days or months during which the data was collected).

FIG. 14 is an example of a user interface 1400 for displaying metrics. In one embodiment, interface 1400 of FIG. 14 provides more detail for user interface 150. Interface 1400 provides metrics over a month for Exchange servers in an IT system. Interface 1400 includes display selection window 1410, data attribute portion 1420 and data value portion 1430.

Display selection window 1410 may list a number of servers or systems, data available for the server and/or system, and a list of attributes for the data. The systems, data type and attributes displayed in window 1410 are derived from display configuration files 134. A user may select one or more of the attributes to view metrics associated with the server or system having the selected attributes. For example, display selection window 1410 illustrates a system of "Exchange" with metrics, measures, outages and MPR data able to be selected for display. Window 1410 illustrates that metrics is selected, as well as attributes of "By Month" and "YTD."

Data attribute portion 1420 lists the data being displayed, such as a metric, measure or other data, as well as a hierarchy of attributes for the particular data. The displayed data, attributes and hierarchy relationship of attributes is defined by backend configuration files. The display of the data and attributes hierarchy in data attribute portion 1420 is derived from display configuration files 134. In some embodiments, the metric id is in the display which is a reference to the MetricGroup xml file that contains the "metric display name." Display configuration files may also define the number of periods to display (e.g. 3 weeks, months, etc) and the number of decimal places.

The illustrated data is "Exchange Data Availability" with first level attributes of Corp, Exchange, and WINSE. A second level of attributes for Corp are NORTHAMERCIA, APJ AND EMEA. A third level of attributes for NORTHAMERICA includes REDMOND and NORTHAMERICA.

Data value portion 1430 includes availability data for each level of metric for different periods of time. The periods of time are specified in various configuration files and schema tables. The data includes a target set of values for each attribute value, and actual data values of each metric for different months of July, June and May. When an actual availability meets or exceeds a target, a circle or other "ok" icon may be displayed next to the data. When an actual availability does not meet a target, a diamond or other "caution" icon may be displayed next to the data. For example, the Exchange mailbox availability for CORP has a target value of 99.990, had a July availability of 99.999 which is associated with an "ok" icon, a June availability of 99.989 which is associated with a "caution" icon, and a May availability of 99.984 which is associated with an "ok" icon.

FIG. 15 is an example of a user interface 1500 for displaying measurement data. In one embodiment, interface 1500 of FIG. 15 provides more detail for user interface 150. Interface 1500 provides measurement data over a period of one week for Exchange servers in an IT system. Interface 1500 includes display selection window 1510, data attribute portion 1520 and data value portion 1530. Display selection window 1510 is the same as window 1410 of FIG. 14 except Measures have been selected to be displayed, by month and YTD, instead of metrics. Data attribute portion 1520 displays a number of data attributes for which measurements are to be displayed. The data attributes are defined by backend configuration files 132 while the display of the data attributes are controlled by display configuration files 134. The displayed data attributes include attachments removed and purged, connections blocked, recipients blocked, senders blocked, messages filtered by IMF and internet messages received. Data value portion 1530 illustrates values of the measure attributes for different weeks. The measure values are the actual number of times that a particular event (the event corresponding to each attribute) occurred. For example, the number of senders blocked was 61,330 during the week of Jul. 30, 2006, 2,925, 965 during the week of Jul. 23, 2006, and 928,702 during the week of Jul. 16, 2006.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A method for providing a flexible and dynamic metric generation system for efficiently generating a metric, comprising:

accessing one or more configuration files and loading the configuration files into a staging database, the staging database having a staging database schema for loading extracted data from two or more data stores, each of the data stores having a different schema than the staging database schema and storing metric data, calculated using the extracted data, in a hierarchical structure of attributes predefined by a user for each metric, at least one of the one or more configuration files includes server extraction parameters specifying instructions for extracting data from the two or more data stores and attribute parameters defining the hierarchical structure of the attributes associated with the metric, at least one of the configuration files identifies availability and weight information associated with the metric, the metric is associated with a trend indicating whether the metric tends to increase or decrease over time, the trend for the metric is used for comparison against a target value defined for the metric;

generating a first unique query by the staging database to extract data from a first data store associated with a first server and a second unique query by the staging database to extract data from a second data store associated with a second server based on the server extraction parameters and the attribute parameters contained in the one or more configuration files, the first server and the second server having a different communication interface and associated with different server extraction parameters;

sending the first unique query to the first server and the second unique query to the second server by the staging database;

receiving a first response with a first extracted data from the first server and a second response with a second extracted data from the second server; and storing the first extracted data in a first set of tables and the second extracted data in a second set of tables, said storing being carried out according to the staging database schema, the first set of tables and the second set of tables located within the staging database; and calculating metric data from the stored first extracted data and second extracted data based on the server extraction parameters and the attribute parameters contained in the one or more configuration files;

aggregating the metric data; and packaging the aggregated metric data, packaging the aggregated metric data including packaging the aggregated metric data as a three dimensional data cube and/or packaging the aggregated metric data into a compressed file to efficiently contain a set of data to display through a user interface;

said accessing one or more configuration files includes accessing the one or more configuration files at different points in time, said accessing one or more configuration files includes merging the one or more configuration files into an XML file;

said calculating metric data includes generating a first calculation task for determining a total number of times that an event occurs, said calculating metric data includes generating a second calculation task for determining the availability of an element as a percentage of a series of data points having a certain value, said calculating metric data includes comparing a metric value for said metric against a target value to determine that the metric value is "green" based on said trend associated with said metric.

2. The method of claim 1, further comprising:
providing a presentation database for aggregating the first extracted data and the second extracted data at each level of the hierarchical structure associated with each metric;
providing a data set generation module for packaging selected portions of data into a package for display; and
providing a display application for accessing the selected portions of data from the data package and displaying the selected portions.

3. The method of claim 1, wherein said step of generating a unique query by the staging database includes:
generating an extraction task by the staging database based on the one or more configuration files; and
performing the extraction task by the staging database in communication with the first server and the second server.

4. The method of claim 1, wherein said step of generating a unique query includes:
determining a number of servers specified in the one or more configuration files, the servers including the first server and second server; and
generating a query for each server specified in the one or more configuration files.

5. The method of claim 1, wherein said step of storing includes:
retrieving a data value and time data from the first response; and
loading the data value and time data into a table.

6. The method of claim 1, wherein said step of storing includes:
generating an inbound data table in the staging database from the one or more configuration files; and
loading the first extracted data from the first response and the second extracted data from the second response into the inbound table.

7. The method of claim 1, further comprising:
storing the metric data in a plurality of tables based on the one or more configuration files.

8. The method of claim 7, wherein said step of calculating metric data includes:
associating one or more attributes with each generated metric, the one or more attributes also associated with at least one of the first extracted data and the second extracted data used to generate the metric.

9. The method of claim 8, further comprising:
transmitting the metric data to a presentation database; and
aggregating the metric data with respect to each metric attribute at the presentation database.

10. The method of claim 9, further comprising:
displaying the aggregated metric data for one or more metric attributes.

11. The method of claim 1, wherein a metrics engine generates the extraction tasks and provides the tasks to the staging database.

12. The method of claim 1, wherein the server extraction parameters include server identification information for one or more servers and database identification information for one or more databases located on each server.

13. The method of claim 9, further comprising:
accessing one or more display configuration files; and
displaying the aggregated metric data in a user interface based on the display configuration files.

14. The method of claim 13, further comprising configuring the user interface from the display configuration files.

15. The method of claim 14, wherein the display configuration files reference hierarchy levels from other configuration files for each metric to be displayed.

16. The method of claim 1, further comprising:
generating an outbound data table in the staging database from the one or more configuration files; and
loading the metric data into the outbound data table in the staging database.

* * * * *